(12) United States Patent
Osada

(10) Patent No.: US 9,405,257 B2
(45) Date of Patent: Aug. 2, 2016

(54) PRINTING CONTROL APPARATUS THAT CONTROLS PRINTING ORDER

(71) Applicant: CANON KABUSHIKI KAISHA, Tokyo (JP)

(72) Inventor: Tomoaki Osada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/084,510

(22) Filed: Nov. 19, 2013

(65) Prior Publication Data

US 2014/0140747 A1    May 22, 2014

(30) Foreign Application Priority Data

Nov. 21, 2012  (JP) ................................ 2012-255117

(51) Int. Cl.
*G03G 15/00*    (2006.01)
*H04N 1/32*     (2006.01)

(52) U.S. Cl.
CPC ........ *G03G 15/6544* (2013.01); *G03G 15/6541* (2013.01); *H04N 1/32464* (2013.01); *B65H 2408/121* (2013.01)

(58) Field of Classification Search
CPC .......... G03G 15/6541; G03G 15/6544; G03G 2215/00818; G03G 2215/00822; G03G 2215/00827; H04N 1/32459; H04N 1/32464; H04N 1/3247; B65H 2301/163; B65H 2301/1635; B65H 2408/12; B65H 2408/121
See application file for complete search history.

(56) References Cited

U.S. PATENT DOCUMENTS

| 8,089,642 B2 * | 1/2012 | Taira ............................ 358/1.13 |
| 2001/0016124 A1 * | 8/2001 | Shiramura ....................... 399/82 |
| 2004/0107854 A1 * | 6/2004 | Nakatani et al. ............... 101/484 |
| 2012/0025440 A1 * | 2/2012 | Kiriyama .................... 270/58.08 |

FOREIGN PATENT DOCUMENTS

| CN | 101011898 A | 8/2007 |
| CN | 101431584 A | 5/2009 |
| CN | 101907844 A | 12/2010 |
| CN | 102310667 A | 1/2012 |
| JP | 2005-88375 A | 4/2005 |
| JP | 2006-085638 A | 3/2006 |
| JP | 2008-221477 A | 9/2008 |
| JP | 2009163139 A * | 7/2009 |

* cited by examiner

*Primary Examiner* — Justin Olamit
(74) *Attorney, Agent, or Firm* — Canon USA, Inc. IP Division

(57) ABSTRACT

A printing apparatus includes an input unit, a specifying unit, a storing unit, a printing unit, a receiving unit, and a control unit. The specifying unit specifies a number of sheets for printing image data pieces of a plurality of pages. The receiving unit receives a binding process execution instruction. When the sheets are printed in the reverse order and the printed sheets are bound, the printing unit had started the reverse order printing after all the image data pieces were stored. When (i) the sheets are to be printed in the reverse order and the binding process is set to be executed and (ii) it is determined, while the storing unit is storing the image data pieces, that the specified number of sheets exceeds the number of sheets that can be bound, the printing unit starts printing in the page order before all the image data pieces are stored.

20 Claims, 17 Drawing Sheets

PORTRAIT PRINTING

LANDSCAPE PRINTING

FIG.10
- REVERSE ORDER, FACE-UP OUTPUT PATTERN (IN CASES OF ★)
- PAGE ORDER, FACE-DOWN OUTPUT PATTERN (IN CASES OF NO ★)
⬅ SHEET FEEDING/DISCHARGING DIRECTION
| SET STAPLING POSITION | PORTRAIT | LANDSCAPE |
|---|---|---|
| NONE | (1)  | (2)  |
| UPPER LEFT | (3)  | (4)★  |
| LOWER LEFT | (5)★  | (6)  |
| UPPER RIGHT | (7)★ 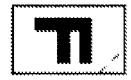 | (8)  |
| LOWER RIGHT | (9) 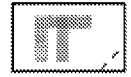 | (10)★  |

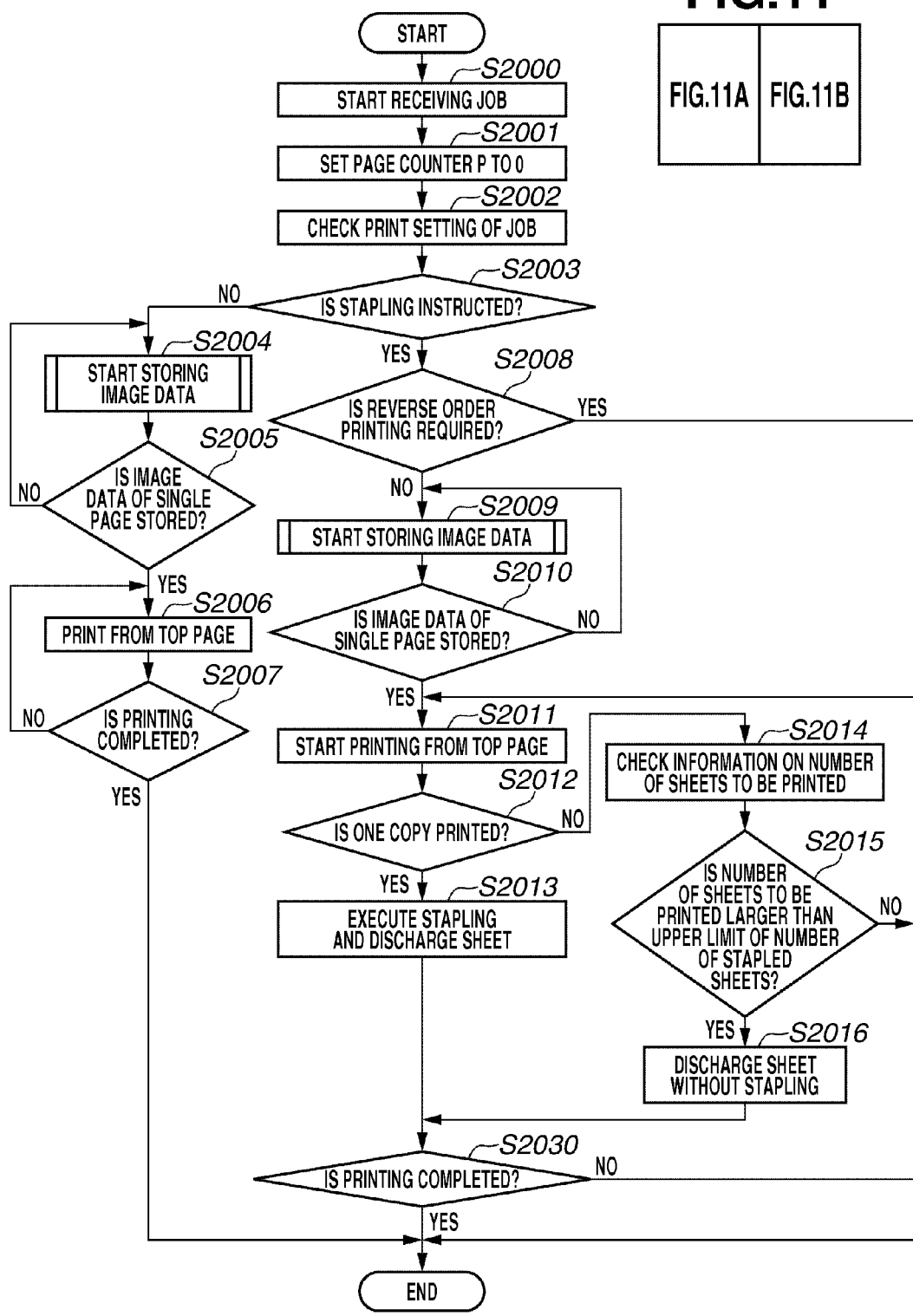

NORMAL ORDER PRINTING
(PRINTING STARTS
FROM TOP PAGE)

REVERSE ORDER PRINTING
(PRINTING STARTS
FROM FINAL PAGE)

FIG.14

| TYPE OF BINDING PROCESSING | |
|---|---|
| STAPLE | STAPLELESS |
| 30 | 5 |

PRINTING CONTROL APPARATUS THAT CONTROLS PRINTING ORDER

BACKGROUND OF THE INVENTION

1. Field of the Invention

The present invention is directed to providing a printing apparatus, a method for controlling the printing apparatus, an information processing apparatus, a method for controlling the image processing apparatus, and a storage medium.

2. Description of the Related Art

A conventional printing apparatus is available that prints images on sheets, and staples the sheets on which the images are printed, with a stapler.

Such a printing apparatus staples the sheets after moving a movable stapler to a position set by a user where the sheets are stapled.

Further, an apparatus has been developed that has no mechanism for moving the stapler, and thus can be manufactured at a lower cost. Such a printing apparatus executes stapling at the position set by the user by performing reverse order printing, or by rotating an image in accordance with a stapling position set by the user (Japanese Patent Application Laid-Open No. 2005-88375).

When the pages are printed in the reverse order, the printing starts from the final page, and thus the printing starts after images of all the pages are stored in a storage unit of the printing apparatus.

Due to mechanic limitations, the stapler can staple only a limited number of sheets at a time. Thus, the conventional printing apparatus does not staple the sheets when the number of sheets to be printed exceeds the upper limit of the number of sheets to be stapled after starting the printing. In this case, the user can manually bundle the sheets by clipping or punching and filing the sheets.

The stapling is not performed when the number of sheets to be printed exceeds the upper limit of the number of stapled sheets also when the reverse order printing is performed. In the reverse order printing, the images of all the pages are stored in the storage unit before the printing is executed. Therefore, the printing apparatus waits until the images of all the pages are stored in the storage unit to execute the reverse order printing even when the stapling is not executed. Thus, compared with the normal order printing, the print start delays meaninglessly and a longer time is required for the printing to be completed.

SUMMARY OF THE INVENTION

A printing apparatus prevents waste of time in executing reverse order printing if the number of sheets to be printed exceeds the upper limit of the number sheets subjected to a binding process. According to an aspect of the present invention, a printing apparatus includes an input unit configured to input image data pieces of a plurality of pages, a specifying unit configured to specify a number of sheets to be used in printing the image data pieces, a storing unit configured to store the image data pieces input by the input unit, a printing unit configured to perform printing to output sheets on which images are printed based on the stored image data pieces, wherein the printing is performed in a page order of the plurality of pages or in a reverse order that is reverse from the page order, a receiving unit configured to receive an instruction to execute a binding process on the output sheets, and a control unit configured to control the printing unit, wherein, when the sheets are printed in the reverse order and the binding process is executed on the printed sheets in accordance with the received instruction, the control unit had controlled the printing unit to start the reverse order printing after all the image data pieces were stored in the storing unit, and wherein, when (i) the sheets are to be printed in the reverse order and the binding process is set to be executed on the sheets based on the received instruction and (ii) it is determined, while the storing unit is storing the image data pieces, that the specified number of sheets exceeds the number of sheets on which the binding process is able to be executed, the control unit controls the printing unit to start printing in the page order before all the image data pieces are stored in the storing unit.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a diagram illustrating sheet output methods according to the first exemplary embodiment.

FIG. 11, which includes FIG. 11A and FIG. 11B, is a flowchart illustrating processing according to the first exemplary embodiment.

FIG. 14 is a diagram illustrating the upper limit of the number of stapled sheets according to the first exemplary embodiment.

DESCRIPTION OF THE EMBODIMENTS

Various exemplary embodiments, features, and aspects of the invention will be described in detail below with reference to the drawings.

Figure 1:
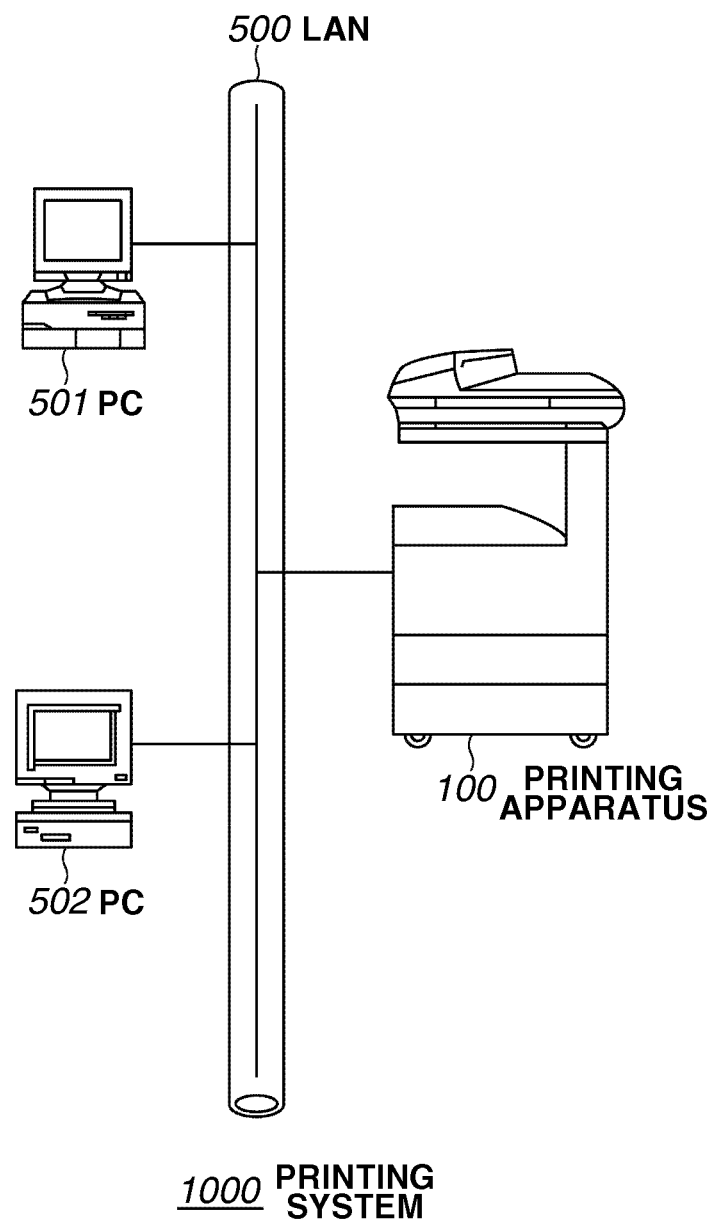
FIG. 1 is a system configuration diagram of a printing system according to a first exemplary embodiment.

FIG. 1 is a diagram illustrating an example of a printing system according to a first exemplary embodiment.

This printing system 1000 includes a printing apparatus 100, a personal computer (PC) 501, a PC 502, and a local area network (LAN) 500. The printing apparatus 100 and the PCs 501 and 502 are connected and can communicate with each other through the LAN 500.

Figure 2:
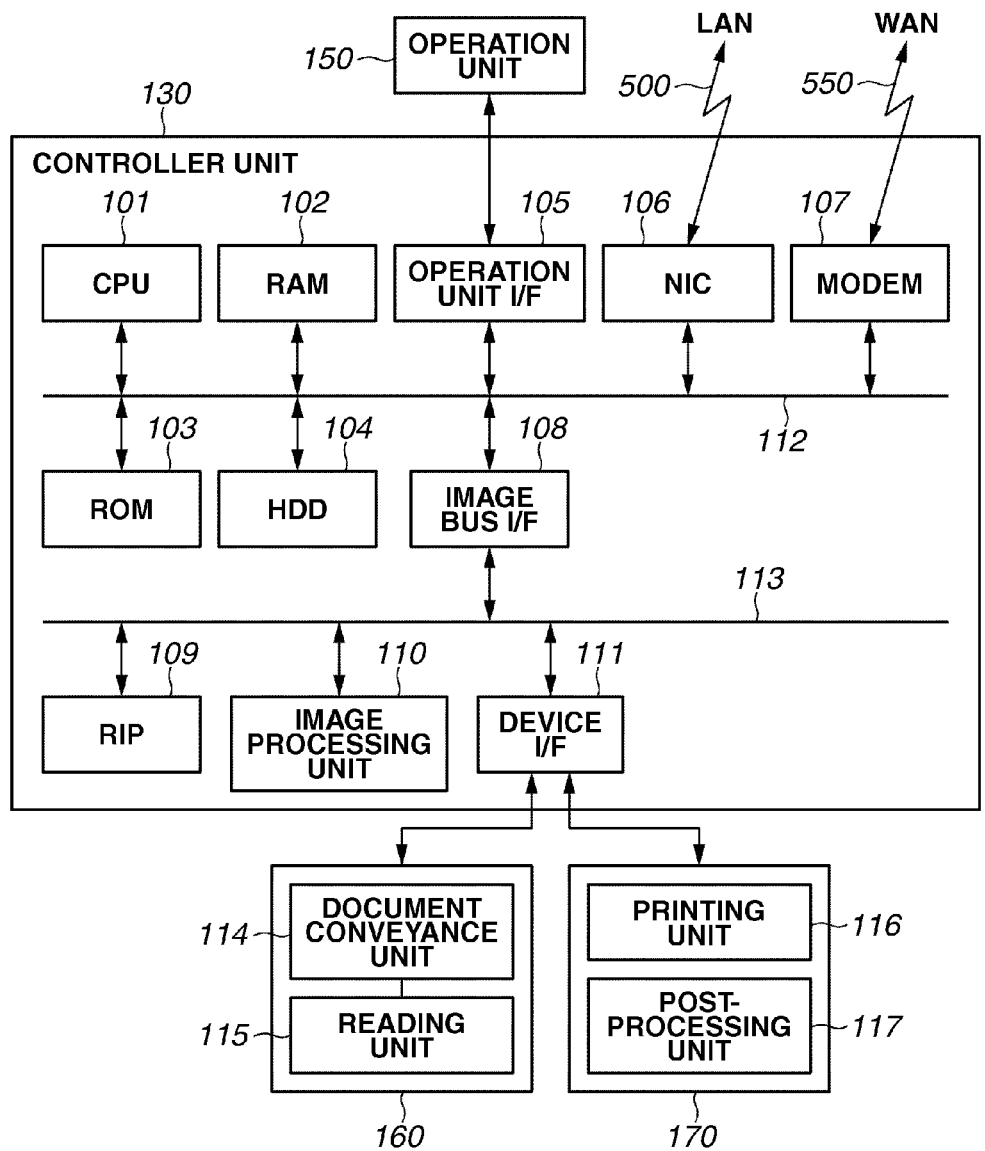
FIG. 2 is a system configuration diagram illustrating a configuration of a controller unit according to the first exemplary embodiment.

FIG. 2 is a diagram illustrating an example of the printing apparatus 100 according to the first exemplary embodiment.

The printing apparatus 100 includes a controller 130, an operation unit 150, an input device 160, and an output device 170.

The controller unit 130 includes a central processing unit (CPU) 101, a random access memory (RAM) 102, a read only memory (ROM) 103, a hard disk drive (HDD) 104, an operation unit I/F 105, a network interface card (NIC) 106, a modem 107, an image bus I/F 108, a raster image processor (RIP) 109, an image processing unit 110, and a device I/F 111.

The CPU 101 comprehensively controls the printing apparatus 100.

The RAM 102 is a memory that stores therein data, and serves as a work area for the CPU 101.

The ROM 103 stores therein a program to be read out by the CPU 101.

The HDD 104 is a mass memory that stores therein image data, a software program, and other data. The HDD 104 is an example of a storage unit and any other types of memories having an enough storage capacity to store therein image data can be used instead.

The operation unit I/F 105 serves as an interface unit for the operation unit 150, and outputs image data to be displayed on the operation unit 150 to the operation unit 150. The operation unit I/F 105 transmits information input by a user through the operation unit 150, to the CPU 101.

The NIC 105 is connected to the LAN 500 and controls communications between the printing apparatus 100 and an external apparatus such as the PCs 501 and 502.

The modem 107 is connected to a wide area network (WAN) 550 and controls input and output of image data and apparatus information to and from an external fax machine.

The image bus I/F 108 is a bus bridge that connects a system bus 112 with an image bus 113 that performs high speed transmission of the image data, and converts the data structure.

The RIP 109 converts print data received from the PC 501 or 502 into a bit map image.

The image processing unit 110 performs image processing such as rotation and enlargement/reduction on the image data.

The device I/F 111 serves as an interface unit for the input device 160 and the output device 170, and controls transmission and reception of data to and from the input device 160 and the output device 170.

The input device 160 includes a document conveyance unit 114 and a reading unit 115, and reads an image of an original document to input image data representing the image of the read original document.

The document conveyance unit 114 picks up an original document set in a document feeding tray, and conveys the original document to a reading position.

The reading unit 115 reads the original document conveyed by the document conveyance unit 114 at the reading position, and then discharges the document out of the apparatus. The reading unit 115 includes a platen and can read the original document placed on the platen.

The output device 170 includes a printing unit 116 and a post-processing unit 117.

The printing unit 116 picks up a sheet from a sheet feeding cassette, and prints an image on the sheet thus fed.

The post-processing unit 117 executes post processing set by the user on the sheet on which the image is printed by the printing unit 116.

Such a printing apparatus 100 executes a copy job by reading the original document with the reading unit 115, storing the image data of the read original document in the HDD 104, and printing an image on the sheet with the printing unit 116 based on the stored image data.

The printing apparatus 100 also executes a print job by receiving image data from an external apparatus such as the PCs 501 and 502 through the LAN 500, storing the received image data in the HDD 104, and printing an image on the sheet with the printing unit 116 based on the stored image data.

The printing apparatus 100 also executes a FAX print job by receiving image data from the external fax machine through the WAN 550 and printing an image on the sheet with the printing unit 116 based on the received image data.

Figure 3:
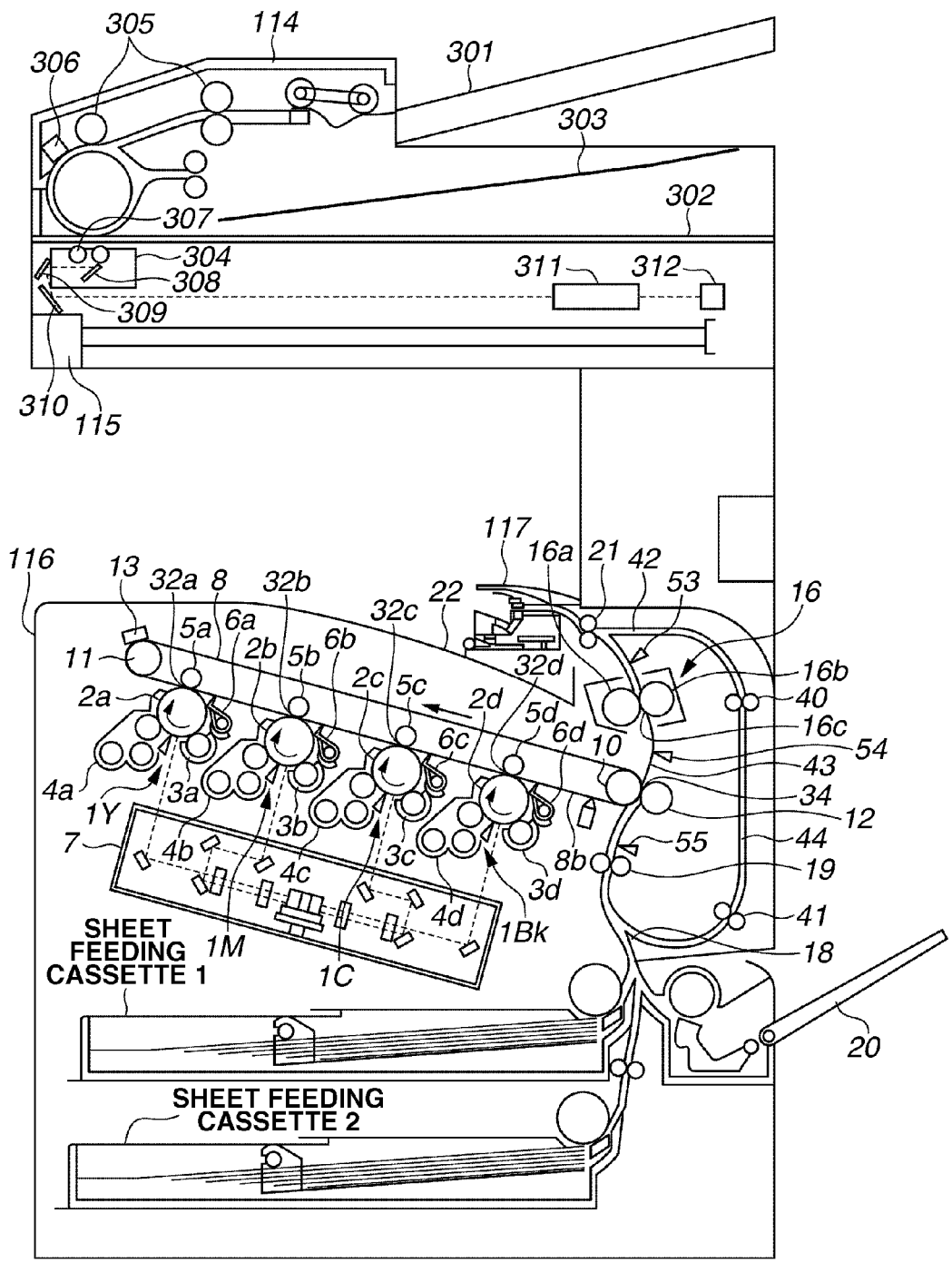
FIG. 3 is a cross-sectional view illustrating a configuration of a printing unit according to the first exemplary embodiment.

FIG. 3 is a cross-sectional view illustrating a configuration of the printing apparatus 100.

In the document conveyance unit 114, original documents stacked on the document feeding tray 301 are conveyed onto a platen glass 302 one at a time from the first one in the stacked order. Then, the original document is scanned on the platen glass 302 and then is discharged onto the discharge tray 303.

A conveyance path that guides the original document is provided with conveyance rollers 305 driven by a stepping motor and a document detection sensor 306 that detects the head and rear edges of the original document.

The conveyance rollers 305 driven by the stepping motor makes the original documents stacked on the document feeding tray 301 pass through a document skimming-through position at a constant speed. Here, an optical unit 307 of the reading unit 115 moves to the document skimming-through position, and irradiates the original document conveyed at the constant speed with light from a light source. The reflected light from the original document is guided by a plurality of mirrors 308, 309, and 310 as well as a lens 311 to a charge-coupled device sensor (hereinafter, referred to "CCD") 312. Thus, the scanned image of the original document is read by the CCD 312. The CCD 312 performs the reading as appropriate, and thus image data of each color (R, G, and B) is generated to be transmitted to the controller unit 130.

The printing unit 116 includes four image forming units 1Y, 1M, 1C, and 1Bk that respectively form yellow, magenta, cyan, and black images. The image forming units 1Y, 1M, 1C, and 1Bk are arranged in a line at a predetermined interval.

The image forming units 1Y, 1M, 1C, and 1Bk respectively include photosensitive drums 2a, 2b, 2c, and 2d as image carriers.

Around the photosensitive drums 2a to 2d, primary charging devices 3a to 3d, developing devices 4a to 4d, transfer rollers 5a to 5d as transfer units, and drum cleaner devices 6a to 6d are respectively disposed.

Below the primary chargers 3a to 3d and the developing devices 4a to 4d, a laser exposure device 7 is disposed.

The developing devices 4a to 4d contain recording materials such as yellow toner, cyan toner, magenta toner, and black toner, respectively.

The photosensitive drums 2a to 2d each include a photoconductive layer on a photosensitive drum base and are each rotatively driven by a driving device (not illustrated) at a predetermined process speed in the clockwise direction in FIG. 3.

With the charging bias applied by a charging bias power source (not illustrated), the primary chargers 3a to 3d uniformly charge the surfaces of the photosensitive drums 2a to 2d to a predetermined negative potential.

The developing devices 4a to 4d containing the toner attach the color toner to an electrostatic latent image formed on the corresponding one of the photosensitive drums 2a to 2d. Thus, the electrostatic latent images are developed (visualized) as toner images.

The transfer rollers 5a to 5d as primary transfer units are disposed so as to be able to come into contact with the photosensitive drums 2a to 2d in primary transfer portions 32a to 32d, respectively, with an intermediate transfer belt 8 as a transfer unit disposed in between.

The drum cleaner devices 6a to 6d include cleaning blades that remove the transfer residual toner remaining on the photo sensitive drums 2 as a result of the primary transfer.

The intermediate transfer belt 8 is disposed on an upper surface side of the photosensitive drums 2a to 2d, and is stretched between a secondary transfer opposing roller 10 and a tension roller 11. The secondary transfer opposing roller 10 is disposed so as to contact a secondary transfer roller 12 in a secondary transfer portion 34 with the intermediate transfer belt 8 disposed in between. The intermediate transfer belt 8 is made of a dielectric resin such as a polycarbonate, a polyethylene terephthalate resin film, or a polyvinylidene fluoride resin film.

Moreover, the intermediate transfer belt 8 has a primary transfer surface 8b as a lower flat surface, which is formed on a side facing the photosensitive drums 2a to 2d, inclined with its secondary transfer roller 12 down below.

Specifically, the intermediate transfer belt 8 is movably disposed while facing upper surfaces of the photosensitive drums 2a to 2d, and has the primary transfer surface 8b, which is formed on the side facing the photosensitive drums 2a to 2d, with its secondary transfer portion 34 down below.

Specifically, an angle of the inclination is set to 15°. Moreover, the intermediate transfer belt 8 is stretched by the secondary transfer opposing roller 10, which is disposed on the secondary transfer portion 34 side and applies driving force to the intermediate transfer belt 8, and the tension roller 11 which is opposed to the secondary transfer opposing roller 10 across the primary transfer parts 32a to 32d.

The secondary transfer opposing roller 10 is disposed so as to contact the secondary transfer roller 12 in the secondary transfer portion 34 with the intermediate transfer belt 8 disposed in between. A belt cleaning unit (not illustrated), which removes and collects transfer residual toner remaining on a surface of the intermediate transfer belt 8, is disposed on the outer side of the intermediate transfer belt 8 at a portion near the tension roller 11.

A fixing unit 16 including a fixing roller 16a and a heating roller 16b is disposed on the downstream side from the secondary transfer portion 34 in a vertical path configuration in the sheet conveyance direction.

The laser exposure unit 7 includes a laser emission unit, which emits light according to time-series electric digital pixel signals of given image information, a polygon lens, and a reflex mirror. By exposing the photosensitive drums 2a to 2d to light, the exposure unit 7 forms electrostatic latent images of the respective colors according to image information on the surfaces of the photosensitive drums 2a to 2d charged by the respective primary chargers 3a to 3d.

Next, image forming operations performed by the printing unit 116 described above will be described.

Upon receiving a print instruction from the controller unit 130, the printing unit 116 performs the following control. The photosensitive drums 2a to 2d of the image forming units 1Y, 1M, 1C, and 1Bk rotatively driven at the predetermined process speed are uniformly charged to the negative potential by the primary charging devices 3a to 3d.

Then, the laser exposure unit 7 outputs a laser beam of a color-separated image signal input from outside from a laser light emitting element, and thus forms electrostatic latent images of the respective colors on the respective photosensitive drums 2a to 2d via the polygon lens, the reflex mirror, and so on.

Then, the developing device 4a to which a developing bias of the same polarity as the charging polarity (negative polarity) of the photosensitive drum 2a is applied attaches yellow toner to the electrostatic latent image formed on the photosensitive drum 2a, and thus visualizes the electrostatic latent image as a toner image.

In the primary transfer portion 32a between the photosensitive drum 2a and the transfer roller 5a, the yellow toner image is primarily transferred onto the intermediate transfer belt 8 by the transfer roller 5a to which a primary transfer bias (opposite in polarity to the toner (positive polarity)) is applied.

Then, the intermediate transfer belt 8 on which the yellow toner image is transferred moves toward the image forming unit 1M. In the image forming unit 1M, the magenta toner image formed on the photosensitive 2b as in the manner described above is superimposed on the yellow toner mage on the intermediate transfer belt 8 in the primary transfer portion 32b.

The transfer residual toner remaining on the photosensitive drums 2 are scraped off by the cleaner blades formed on the drum cleaner devices 6a to 6d to be collected.

In the similar manner, the cyan and the black toner images respectively formed by the photosensitive drums 2c and 2d of the image forming units 1C and 1Bk are superimposed in this order on the yellow and magenta toner images transferred onto the intermediate transfer 8 belt in the superimposed manner, in the primary transfer portions 32c and 32d. As a result, a full color toner image is formed on the intermediate transfer belt 8.

Then, a leading end of the full-color toner image on the intermediate transfer belt 8 is moved to the secondary transfer portion 34 between the secondary transfer opposing roller 10 and the secondary transfer roller 12. At the same time, a recoding sheet selectively picked up from the sheet feeding cassette 17 or the manual feeding tray 20 and conveyed through the conveyance path 18 is conveyed to the secondary transfer part 34 by registration rollers 19. In the first exemplary embodiment, a conveyance path extending from the resist roller 19 to the discharge rollers 21 is referred to as a one-sided printing conveyance path.

The full-color toner image is secondarily transferred onto the transfer material P, which has been conveyed to the secondary transfer part 34, in a collective manner by the secondary transfer roller 12 to which a secondary transfer bias (opposite in polarity to the toner (positive polarity)) is applied.

The sheet on which the full color toner image is formed is conveyed to the fixing device 16 where the full color toner image is heated and pressurized at a fixing nip portion 31 between the fixing roller 16a and the pressing roller 16b to be thermally fixed onto the surface of the sheet. Then, the sheet is conveyed to the post-processing unit 17 to be described later by discharge rollers 21. When the post processing is to be performed, the post-processing unit 117 performs stapling processing by holding a plurality of sheets conveyed by the discharge rollers 21, and binding driving a staple in the sheets.

When the post processing is not to be performed the sheet is discharged onto the discharge tray 22, and the series of image forming operations are completed.

The secondary transfer residual toner and the like remaining on the intermediate transfer belt 8 is removed and collected by the belt cleaning device.

Next, the configuration of the post-processing unit 17 in FIG. 3 will be described in detail with reference to FIG. 4.

The post-processing unit 117 controls sheet conveyance and post processing upon receiving an instruction from the controller unit 130 through a printer engine I/F unit 814.

The post-processing unit 117 receives the sheet conveyed by the discharge rollers 21. The conveyance of the sheet from the discharge rollers 21 is detected by a sheet detection sensor 817. When the sheet detection sensor 817 detects that the sheet is conveyed to the post-processing unit 117, discharge rollers 71 driven by the motor of the printing unit 116 discharges the sheet so that the rear edge of the sheet in the conveyance direction is placed on a bundle tray 60.

Each sheet discharged onto the bundle tray 60 is shifted to the stapler 58 side by a sheet alignment member (not illustrated). When the stapler 58 does not execute the stapling, the post-processing unit 117 shifts a sheet bundle of a predetermined number of sheets to the stapler 58 side, and then makes a bundle discharge slider 819 slide along a slider bar 818 so that the sheet bundle is discharged on the discharge tray 22.

When the stapler 58 executes the stapling, the post-processing unit 117 shifts the sheet bundle of the predetermined number of sheets to the stapler 58 side and then staples the sheet bundle with the stapler 58. Then, the post-processing unit 117 makes the bundle discharge slider 819 slide along the slider bar 818 so that the sheet bundle bound by the staple processing is discharged onto the discharge tray 22.

Figure 4:
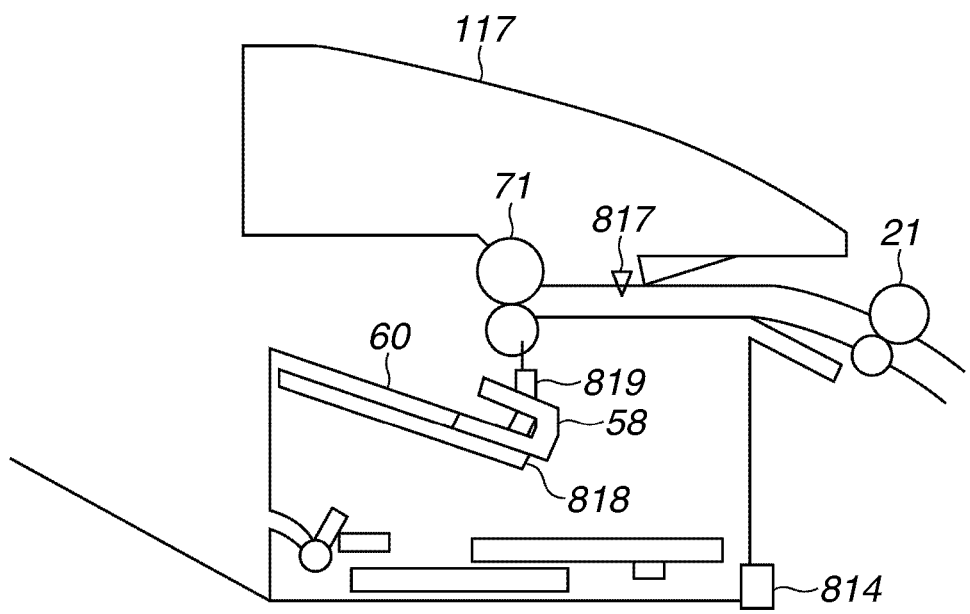
FIG. 4 is a cross-sectional view illustrating a configuration of a post-processing unit according to the first exemplary embodiment.

The stapler 58 is fixed on the forward side in FIG. 4 and cannot move to the rear side in the figure. With the configuration described above, the printing apparatus 100 includes no mechanism for moving the stapler 58, and thus can have a small size and can be manufactured at a reduced cost.

Figure 5:
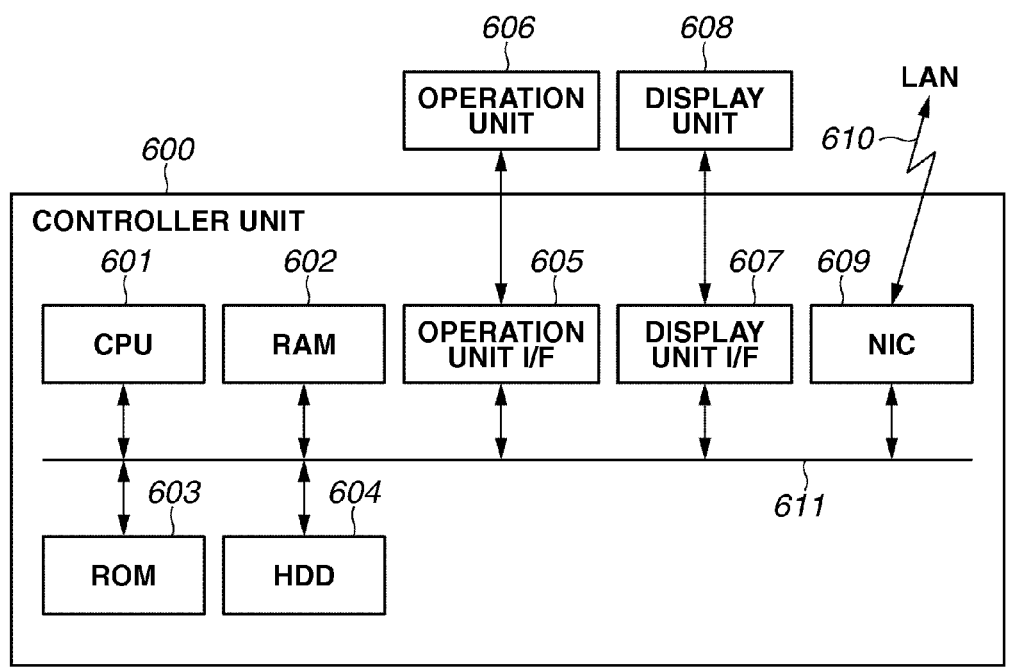
FIG. 5 is diagram illustrating a relationship between set stapling positions and sheet conveyance control according to the first exemplary embodiment.

The configuration of the PC 501 is described with reference to FIG. 5. The PC 502 has the same configuration. The PCs 501 and 502 are each an example of an information processing device.

The PC 501 includes a controller unit 600, an operation unit 606, and a display unit 608. The controller unit 600 includes a CPU 601, a RAM 602, a ROM 603, an HDD 604, an operation unit I/F 605, a display unit I/F 607, and an NIC 609.

The CPU 601 comprehensively controls the PC 501.

The RAM 602 stores therein data, and serves as a work area for the CPU 601.

The ROM 603 stores therein a program to be read out by the CPU 601.

The HDD 604 is a mass memory that stores therein an application program, a printer driver, image data generated by the application program. The HDD 604 is an example of a storage unit and any other types of memories having a storage area of a large capacity can be used instead.

The operation unit I/F 605 serves as an interface unit for the operation unit 606, and transmits the information instructed by the user of the PC 501 through the operation unit 606 to the CPU 601.

The operation unit 606 includes a mouse and a keyboard, and receives an operation of a user. The operation unit 606 may include a touch panel sheet attached on the display unit 608.

The display unit I/F 607 serves as an interface unit for the display unit 608, and outputs image data to be displayed on the display unit 608 to the display unit 608.

The display unit 608 is formed of a liquid crystal display (LCD), a cathode ray tube (CRT) display, and the like, and displays an operation screen and an image.

The NIC 609 is connected to the LAN 610 and controls communications between the PC 501 and an external apparatus such as the printing apparatus 100.

Such a PC 501 generates an image with the application program stored in the HDD 604, and transmits the image thus generated to the printing apparatus 100 through the printer driver.

Figure 6:
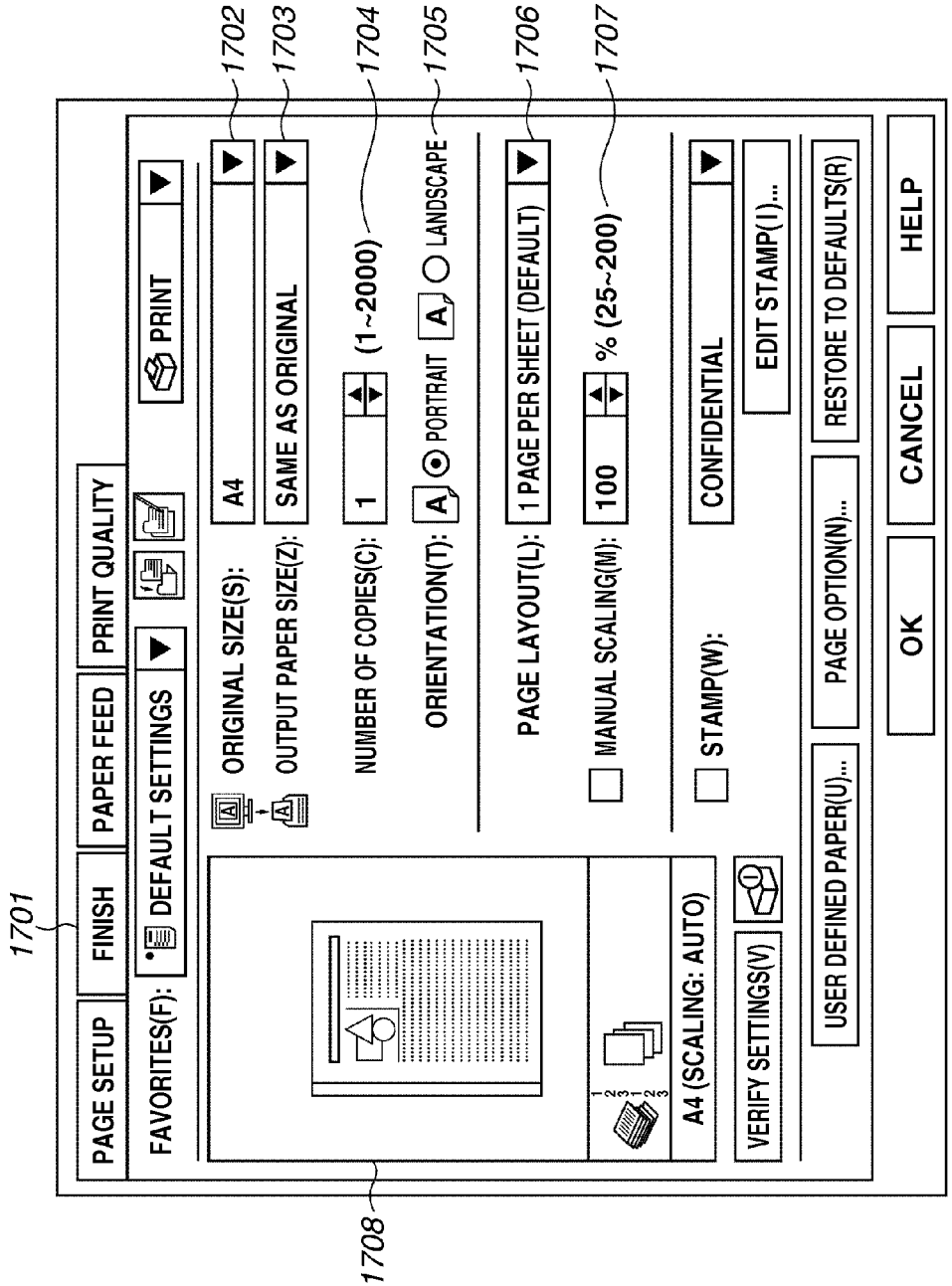
FIG. 6 is a diagram illustrating a screen of a printer driver according to the first exemplary embodiment.

An example of a screen of the printer driver is illustrated in FIG. 6. User operates the operation unit 606 to operate the screen of the printer driver, and thus performs print setting.

The screen illustrated in FIG. 6 is for page setup such as setting original size, or output size.

An original size menu 1702 is for setting the size of the original document to be printed.

An output size menu 1703 is for setting the size of the sheet to be used in the printing.

A number of copies menu 1704 is used for setting the number of print copies.

An orientation menu 1705 is for setting the orientation.

A page layout menu 1706 is for setting the number of pages to be printed on a single sheet.

A print image display unit 1708 displays how the sheet is processed in accordance with the selected print settings.

A finish tab 1701 is used for displaying a screen with which the user sets one-sided/duplex printing, an instruction to execute stapling, and a stapling position.

Figure 7A:
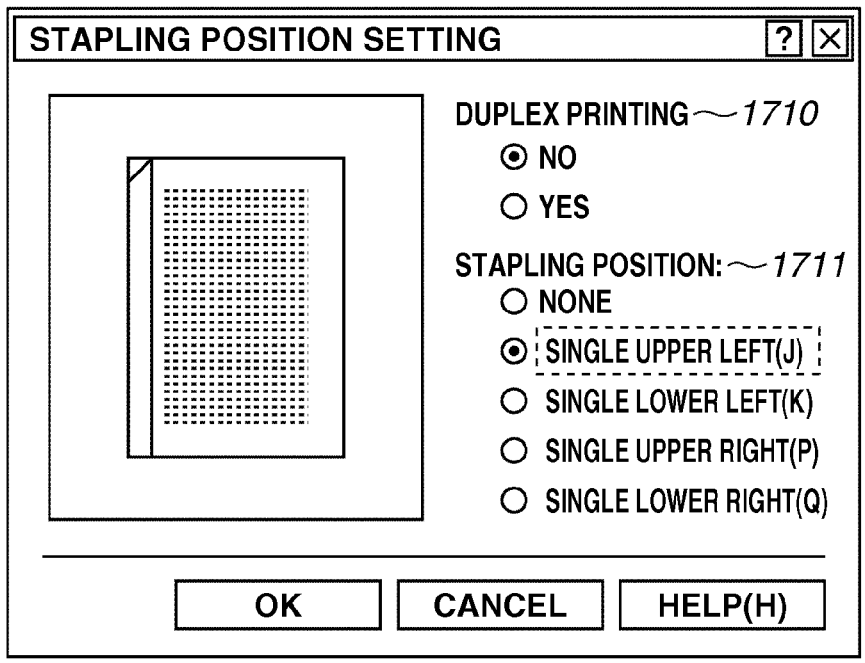
FIGS. 7A and 7B are diagrams illustrating screens of the printer driver according to the first exemplary embodiment.
Figure 7B:
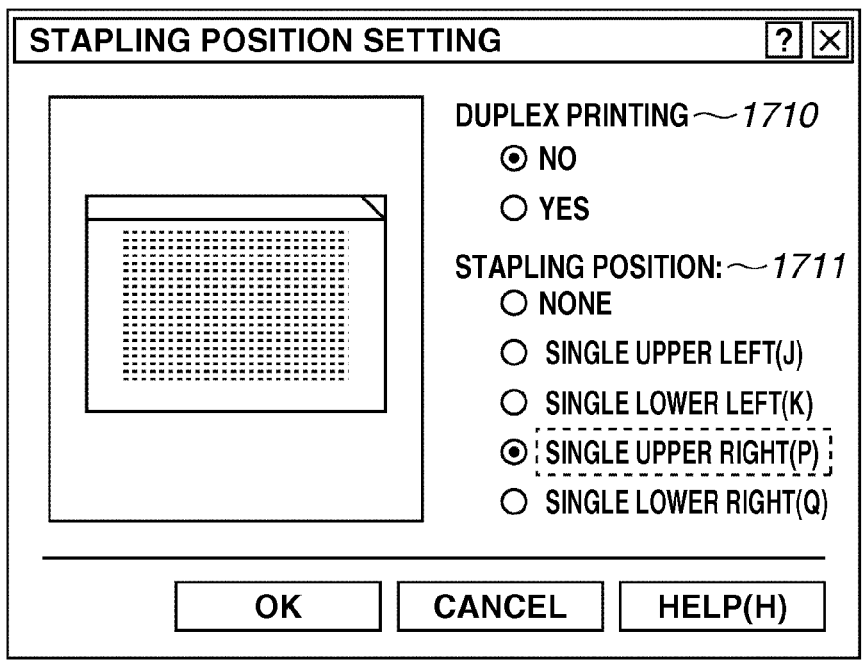

When the finish tab 1701 is pressed, a screen illustrated in FIG. 7A or 7B is displayed.

When the finish tab 1701 is pressed with "portrait" selected in the orientation menu 1705, the screen illustrated in FIG. 7A is displayed. When the finish tab 1701 is pressed with "landscape" selected in the orientation menu 1705, the screen illustrated in FIG. 7B is displayed.

A duplex print menu 1710 in the screen illustrated in FIG. 7 is used for determining whether to perform the duplex printing.

The staple menu 1711 is a menu for determining whether to perform stapling. When the stapling is to be performed, the user selects any one of upper left, lower left, upper right, and lower right.

When the OK button is pressed with the setting made in the duplex printing menu 1710 and the staple menu 1711, the CPU 601 of the PC 501 stores the set contents in the RAM 602 as the print settings, and causes the display unit 608 to display the screen illustrated in FIG. 6.

When OK button is pressed in the screen illustrated in FIG. 6, the CPU 601 stores the setting made in the screens illustrated in FIG. 6 and FIG. 7 in the RAM 602 as print settings, and transmits the print settings and image data to the printing apparatus 100 as a print job.

Figure 8:
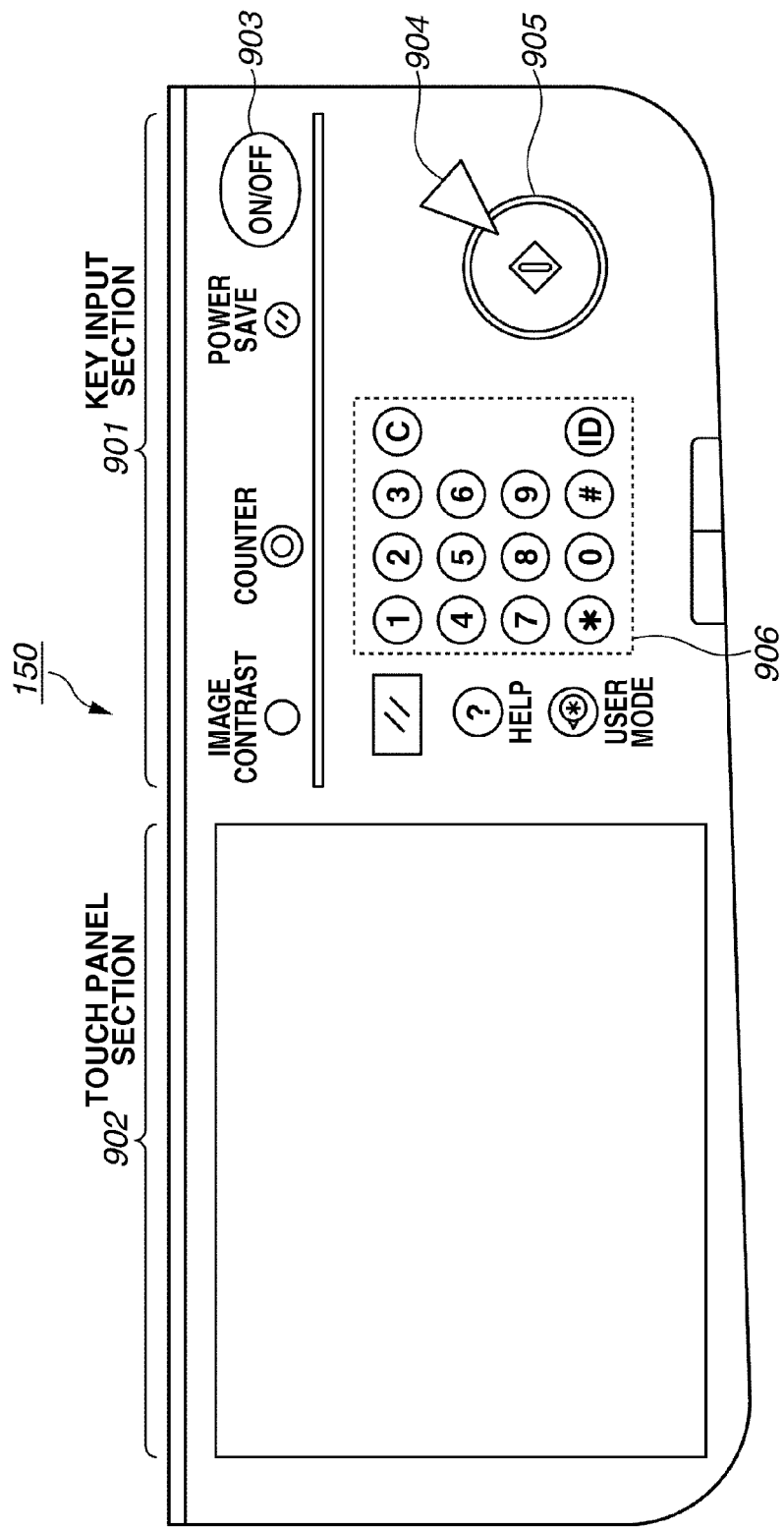
FIG. 8 is a diagram illustrating a screen of an operation unit according to the first exemplary embodiment.

Next, the operation unit 150 of the printing apparatus 100 is decried with reference to FIG. 8.

The operation unit 150 includes a key input section 901 that receives a user operation through hard keys and a touch panel section 902 in which soft keys (displayed keys) can be displayed and receives the user operation through the soft keys.

First, the key input section 901 is described. As illustrated in FIG. 8, the key input section 901 includes an operation unit power source switch 903. When the user presses the operation unit power source switch 903 while the printing apparatus 100 is in a standby mode (normal operation condition), the CPU 101 switches the operation mode of the printing apparatus 100 from the standby mode to a sleep mode (with smaller power consumption). When the user presses the operation unit power source switch 903 while the printing apparatus 100 is in the sleep mode, the CPU 101 switches the operation mode of the printing apparatus 100 from the sleep mode to the standby mode.

The start key 905 is used for receiving instruction from the user to cause the printing apparatus 100 to perform a copy operation and a data transmission and reception operation.

The stop key 904 is used for receiving an instruction to stop the copy operation and the data transmission operation.

Ten keys 906 are used by the user to set the register number in various settings.

Next, the touch panel section 902 is described. The touch panel section 902 includes the LCD and the touch panel sheet attached on the LCD made of transparent electrodes.

The touch panel section 902 has functions of receiving various settings from the user and informing the user of information.

FIG. 9 illustrates examples of screens displayed on the touch panel section 902.

Figure 9A:
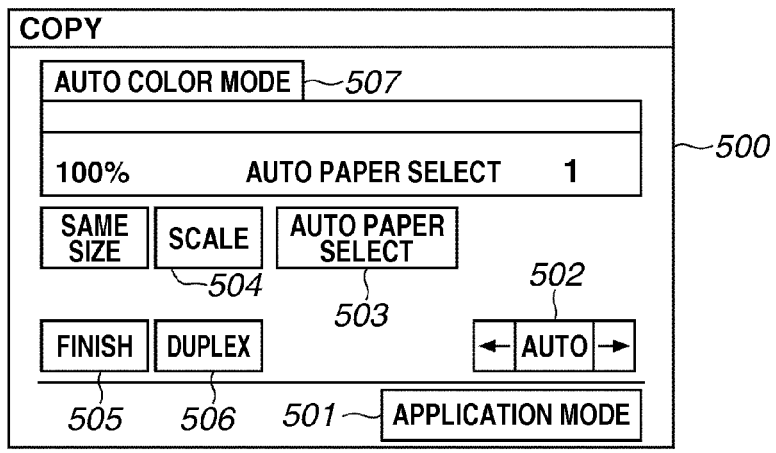
FIGS. 9A to 9C are diagrams illustrating screens of the operation unit according to the first exemplary embodiment.

FIG. 9A illustrates an initial screen 500 displayed on the touch panel section 902 when the printing apparatus 100 is activated.

The initial screen 500 includes an application mode key 501, a density adjustment key 502, a paper select key 503, a scale setting key 504, a finish key 505, a duplex setting key 506, and a color mode setting key 507. The user can perform print job setting through pressing the keys.

The application key 501 is used for setting a reduction layout function of performing printing with images of a plurality of read original documents arranged on a single printing sheet, and a preview function of displaying an image of the read original document on the touch panel section 902 before the printing.

The density adjustment key 502 is used for adjusting the print density.

Figure 9B:
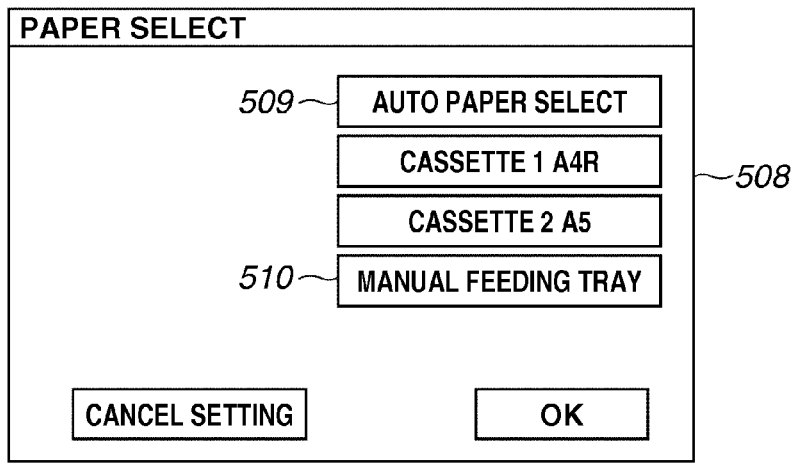

The paper select key 503 is for displaying a paper select screen 508 illustrated in FIG. 9B. The paper select screen 508 is used for receiving the setting from the user to determine the sheet feed cassette as a paper feed source of the printing sheet.

An auto paper select key 509 in FIG. 9B is used to activate the auto paper selection function of making the CPU 101 select the sheet feed cassette to be used for the printing in accordance with the size and the color type (whether the original document has a color image or a monochrome image) of the original document.

A sheet feed cassette select key 501 is used when the user directly selects one of sheet feed cassettes 1 and 2 to be used in the printing instead of making the printing apparatus 100 select the cassette used in the printing. The cassettes 1 and 2 and the manual feed tray in the screen illustrated in FIG. 4B respectively correspond to the sheet feed cassettes 1 and 2 and the manual feeding tray 20. When the OK button in FIG. 9B is pressed, the content of setting selected by the automatic paper select key 509 or the sheet feed cassette select key 510 is stored in the RAM 102 as the print setting by the CPU 101.

The manual scaling 504 key is used for setting a printing scale.

Figure 9C:
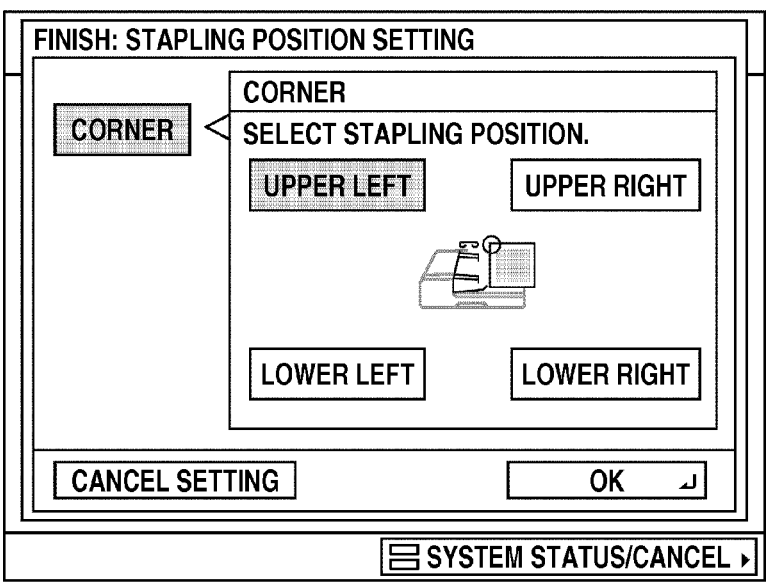

The finish key 505 is used for displaying a post-processing setting screen illustrated in FIG. 9C. When the finish key 505 is pressed, the CPU 101 displays the screen illustrated in FIG. 9C on the operation unit 150. The user sets the stapling position of the original document placed on the original document feed tray 301. The user can select any one of upper left, lower left, upper right, and lower right. When the OK button in the screen illustrated in FIG. 9C is pressed, the CPU 101 stores the specified stapling position as the print setting in the RAM 102.

The duplex key 506 is used for setting the duplex printing.

The color mode setting key 507 is used for determining the color type of the image on the original document.

The contents set through FIG. 9A to 9C are stored in the RAM 102 as the print settings. Then, when the start key 905 in FIG. 8 is pressed, the copy job is executed in accordance with the print settings stored in the RAM 102.

The printing apparatus 100 having the configuration described above executes the print job received from the PC 501 or the copy job received through the operation unit 150 in accordance with the print settings.

When the stapling is instructed in the print settings, the CPU 101 prints images and then staples the sheets on which the images are printed. The output method (face up/face down) is set to "not specified" or "auto".

In the screen illustrated in FIG. 7, the user can set the stapling position of the sheet P to any one of four corners of "upper left", "lower left", "upper right", and "lower right". The position of the stapler 58 of the post-processing unit 117 is fixed on the front side in FIG. 4. Thus, the CPU 101 executes stapling at the position desired by the user by rotating the image and selecting the output method (face down/face up) of the sheet in accordance with the stapling position set by the user.

Relationships among the stapling position, an orientation of the image, and facedown/face up is specifically described with reference to FIG. 10.

The printing apparatus 100 according to the first exemplary embodiment can convey sheets of three sizes, i.e., A4R, B5, and A5. The letter "R" in A4R indicates an orientation of the sheets in which the sheets are conveyed with their shorter side being the head in the conveyance direction. Here, an example will be described where the A4R sheets are stapled.

In FIG. 10, the letter "F" represents the image to be printed and the orientation of F represents the orientation of the image to be printed on the sheet P. Ones with the black F letter represent face up output (the printed surface can be seen on the output sheet as viewed from the above), and ones with the gray F letter represent face down output (back surface of the printed surface can be seen on the output sheet as viewed from the above).

If no stapling position is set (none), the sheet is picked up from the sheet feeding cassette, passes through the one-sided printing conveyance path 43, and is discharged onto the discharge tray 22 after the image is formed. Here, when the orientation is set to "portrait", the sheet on which the image F is printed as illustrated in FIG. 10(1) is discharged onto the discharge tray 22. When the orientation is set to "landscape", the sheet on which the image F is printed as illustrated in FIG. 10(2) is discharged onto the discharge tray 22.

When the specified stapling position is "upper left" and the orientation is set to "portrait" the sheet passes through the one-sided printing conveyance path 43 and the image obtained by rotating the image 180° compared with the case of the specified stapling position "none" is formed. Then, the stapling can be performed on "upper left" of the image with the stapling performed in the post-processing unit 117 (FIG. 10(3)).

Here, when the orientation is set to "landscape", the input images are printed from the final page (reverse order printing). Thus, the sheet passes through the one-sided printing conveyance path 43 to form the image thereon, then is switched back to pass through a duplex printing conveyance path 44, and is reversed. As the final step, the post-processing unit 117 staples the sheets, and thus the stapling can be performed on "upper left" of the image (FIG. 10(4)).

When the specified stapling position is "lower left" and the orientation is set to "portrait", the input images are printed form the final page (reverse order printing). The sheet passes through the one-sided printing conveyance path 43 and the image obtained by rotating the image 180° compared with the case of the specified stapling position "none" is formed. Then, the sheet is switched back by the discharge rollers 21, passes through the duplex printing conveyance path 44, and is reversed. As the final step, the post-processing unit 117 staples the sheets, and thus the stapling can be performed on "lower left" of the image (FIG. 10(5)).

Here, when the orientation is set to "landscape", The sheet passes through the one-sided printing conveyance path 43 and the image obtained by rotating the image 180° compared with the case of the specified stapling position "none" is formed. Then, the post-processing unit 117 staples the sheets, and thus the stapling can be performed on "lower left" of the image (FIG. 10(6)).

When the specified stapling position is "upper right" and the orientation is set to "portrait", the input images are printed from the final page (reverse order printing). The sheet passes through the one-sided printing conveyance path 43 to form the image thereon. Then, the sheet is switched back by the discharge rollers 21, passes through the duplex printing conveyance path 44, and is reversed. As the final step, the post-processing unit 117 staples the sheets, and thus the stapling can be performed on "upper right" of the image (FIG. 10(7)).

Here, when the orientation is set to "landscape", the sheet passes through the one-sided printing conveyance path 43 to form the image thereon. Then, the post-processing unit 117 staples the sheets, and thus the stapling can be performed on "upper right" of the image (FIG. 10(8)).

When the specified stapling position is "lower right" and the orientation is set to "portrait", the sheet passes through the one-sided printing conveyance path 43 to form the image thereon. Then, the post-processing unit 117 staples the sheets, and thus the stapling can be performed on "lower right" of the image (FIG. 10(9)).

Here, when the orientation is set to "landscape", the input images are printed form the final page (reverse order printing). The sheet passes through the one-sided printing conveyance path 43 and the image obtained by rotating the image 180° compared with the case of the specified stapling position "none" is formed. Then, the sheet is switched back by the discharge rollers 21, passes through the duplex printing conveyance path 44, and is reversed. As the final step, the post-processing unit 117 staples the sheets, and thus the stapling can be performed on "lower right" of the image (FIG. 10(10)).

In the first exemplary embodiment, the example is described where the stapler 58 of the post-processing unit 117 is fixed on the front side in FIG. 4. When the stapler 58 of the post-processing unit 117 is to be fixed on the rear side in FIG. 4, the table illustrated in FIG. 10 is changed as appropriate.

As described above, depending on the stapling position and the orientation, the reverse order printing starting from the final page is required.

To start the printing from the final page, the CPU 101 starts the printing after the image data of all the pages in the print job are stored in the HDD 104. Thus, the waiting time until the printing starts is longer than the normal order printing in which the printing is performed in the page order. Thus, the longer time is required for completing the printing.

Furthermore, the upper limit of the number of sheets that can be printed with single binding processing in the post-processing unit 117 is set. It is assumed in the first exemplary embodiment that the post-processing unit 117 can bind 30 sheets (plain paper) in the single binding processing. However, the upper limit is not limited to 30. The upper limit may be determined based on the maximum number of sheets the post-processing unit 117 can hold with the bundle tray 60, or the binding capacity of the stapler 58. The upper limit can be determined in accordance with the type of the sheet, and may be 50 in a case of thin paper, for example.

The CPU 101 performs control so that, when the number of sheets to be printed exceeds the upper limit of the number of stapled sheet, while the image are printed on the sheets, the sheets are not stapled.

Here, when the printing starts after the image data of all the pages of the print job is stored in the HDD 104 in an attempt to perform reverse order printing even though the number of sheets to be printed exceeds the upper limit of the number of stapled sheet and thus the sheets are not to be stapled, a meaninglessly long time is required for the printing.

Thus, the CPU 101 of the printing apparatus 100 determines whether the number of sheets to be printed exceeds the upper limit of the number of stapled sheets while storing all the image data of the pages of the print job in the HDD 104 upon determining that the reverse printing is required.

If the image data of the final page is stored in the HDD 104 without the number of sheets to be printed exceeding the upper limit of the number of stapled sheets, the CPU 101 executes the reverse order printing from the final page.

Upon determining that the number of sheets to be printed exceeded the upper limit of the number of stapled sheets, the CPU 101 performs control so that the pages stored in the HDD 104 up this point is sequentially printed from the top page even through the image data of the final page has not been stored in the HDD 104. Thus, the time required for completing the printing can be prevented from being meaninglessly long. The CPU 101 determines the number of sheets to be printed based on the number of pages stored in the HDD 104 and the print settings, as will be described in detail later.

Here, the example is described where the output method (face up/face down) of sheets is set to "not specified" or "auto". When the sheet output method is set to "face up", the CPU 101 may perform control so that the following operations are performed. Specifically, the printing method is not switched to the normal order printing (printing from the top page) even when the number of sheets to be printed exceeds the upper limit of the number of stapled sheets while image data pieces of all the pages are being stored in the HDD 104 to perform reverse order printing.

Then, the printing starts from the final page after the image data pieces of all the pages of the print job are stored in the HDD 104. If the capacity of the HDD 104 is used up before the image data pieces of all the pages of the print job are stored in the HDD 104, the printing starts from the top page. The image data pieces of the pages that have been printed are deleted from the HDD 104 so that the free capacity is secured.

Figure 11B:
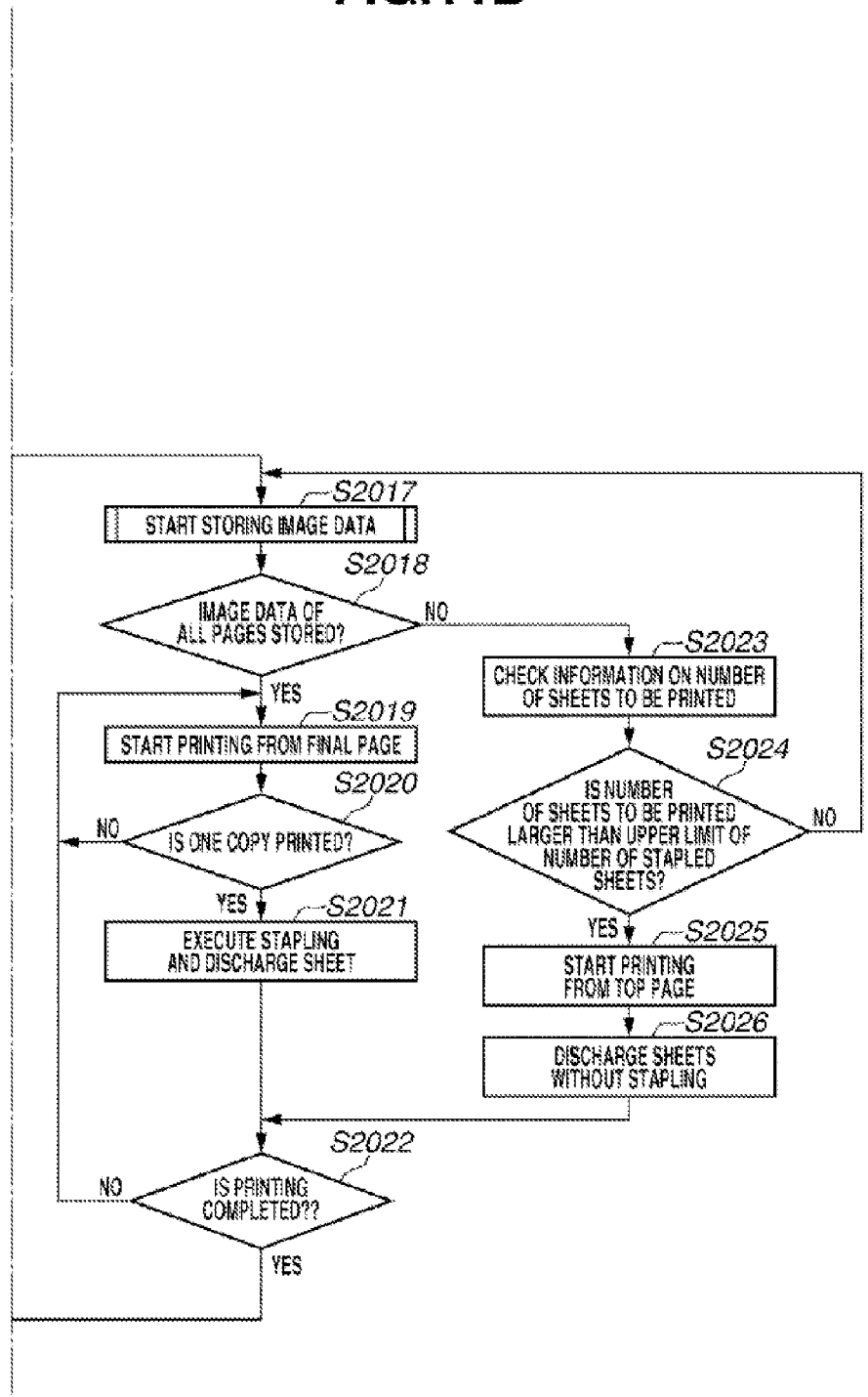

Next, processing in the first exemplary embodiment is described with reference to the flowchart in FIG. 11. The processing is executed as the CPU 100 of the printing apparatus 100 reads out and executes the program stored in the ROM 102.

In step S2000, the CPU 101 starts receiving a job. For example, the CPU 201 starts receiving a printing job transmitted from the PC 501. Here, the print job includes image data of a plurality of pages and print settings.

In step S2001, the CPU 101 prepares a page counter P in the RAM 102, and sets P to 0 as the initial value.

In step S2002, the CPU 101 checks the print settings of the job by analyzing the header of the job received in step S2000. The header of the job is transmitted from the PC 501 prior to the image data pieces of the job, and thus the CPU 101 can analyze the header of the job before all the image data pieces of the job are stored in the HDD 104.

In step S2003, the CPU 101 determines whether the stapling is instructed in the print settings checked in S2002. The processing proceeds to step S2004 if the stapling is not instructed, and proceeds to step S2008 if the stapling is instructed.

When the processing proceeds to step S2004, the CPU 101 starts storing image data in the HDD 104. The image data storing processing will be described in detail later with reference to FIG. 12.

In step S2005, the CPU 101 determines whether the image data of a single page is stored in the HDD 104. If the data is not stored, the CPU 101 continues storing the image data, and if the data is stored, the processing proceeds to step S2006.

Figure 13A:
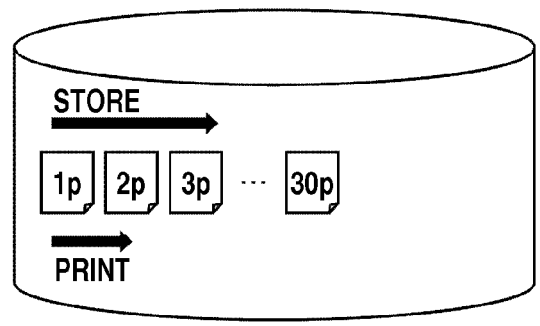
FIGS. 13A to 13D are diagrams illustrating printing of stored images data according to the first exemplary embodiment.
Figure 13B:
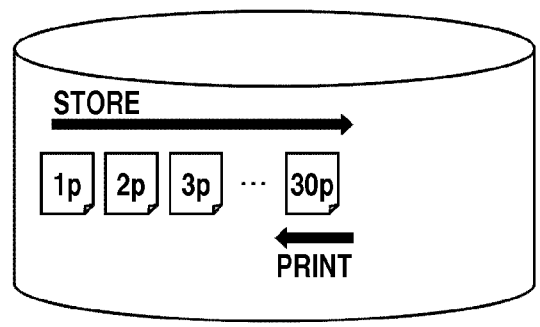

In step S2006, the CPU 101 controls the printing unit 116 so that the image data pieces stored in the HDD 104 is printed from the top page. For example, if the image data of 30 pages are transmitted from the PC 501, the CPU 101 sequentially stores the image data in the HDD 104 from the image data of the first page as illustrated in FIG. 13A, and starts printing from the first page.

In step S2007, the CPU 101 determines whether the printing is completed. The processing returns to step S2006 if the printing is not completed, and is terminated if the printing is completed.

If the CPU 101 determines in step S2003 that the stapling is instructed in step S2003, the processing proceeds from step S2003 to step S2008 where the CPU 101 determines whether the reverse order printing (printing from the final page) is required based on the stapling position, the orientation, and the table in FIG. 10. The processing proceeds to step S2009 if the CPU 101 determines that the reverse printing is not required and proceeds to step S2017 if the CPU 101 determines that the reverse printing is required As will be described in detail with reference to FIG. 12, the CPU 101 starts storing the image data pieces in step S2009.

In step S2010, the CPU 101 determines whether the image data of a single page is stored in the HDD 104. If the data is not stored, the CPU 101 continues storing the image data, and if the data is stored, the processing proceeds to step S2011.

In step S2011, the CPU 101 controls the printing unit 116 so that the printing starts from the top page. For example, if the image data of 30 pages is transmitted from the PC 501, the CPU 101 sequentially stores the image data in the HDD 104 from the image data of the first page as illustrated in FIG. 13A, and starts printing from the first page.

In step S2012, the CPU 101 determines whether one copy is printed. The processing proceeds to step S2013 if the CPU 101 determines that one copy is printed, and proceeds to step S2014 if the CPU 101 determines that one copy is not printed.

When the processing proceeds to step S2013, the CPU 101 staples the sheet bundle stacked on the bundle tray 60, and discharges the stapled sheet bundle onto the discharge tray 22. Then, the processing proceeds to step S2030.

In step S2030, the CPU 101 determines whether the printing job is completed. When the set number of copies to be printed is 1, the CPU 101 determines whether one copy is printed. When the set number of copies to be printed is more than one, the CPU 101 determines whether the set number of copies is printed. If the CPU 101 determines that the printing job is completed, the processing is terminated. If the CPU 101 determines that the printing job is not completed, the processing proceeds to step S2011 and printing of the next copy is executed.

When the processing proceeds from step S2012 to step S2014, the CPU 101 checks the information on the number of sheets to be printed. The information on the number of sheets to be printed is updated by the processing in FIG. 12.

In step S2015, the CPU 101 determines whether the number of sheets to be printed exceeds the upper limit of the number of stapled sheets. The processing returns to S2011 if the CPU 101 determines that the number of sheets to be printed does not exceed the upper limit of the number of stapled sheets, and the printing continues, and proceeds to step S2016 if the CPU 101 determines that the number of sheets to be printed exceeded the upper limit of the number of stapled sheets.

In step S2016, the CPU 101 discharges the sheet bundle stacked on the bundle tray 60 to the discharge tray 22 without stapling the sheet bundle. Then, the processing proceeds to step S2030.

Figure 12:
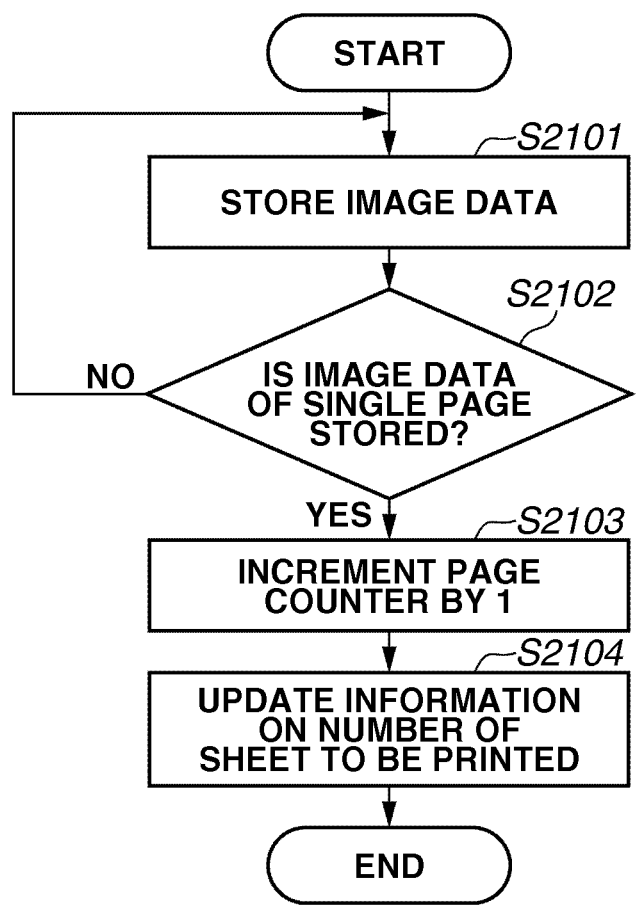
FIG. 12 is a flowchart illustrating processing according to the first exemplary embodiment.

When the processing proceeds from step S2008 to step S2017, the CPU 101 starts storing the image data as will be described in detail with reference to FIG. 12.

In step S2018, the CPU 101 determines whether the image data of all the pages are stored. The processing proceeds to step S2019 when the CPU 101 determines that the image data of all the pages are stored, and proceeds to step S2023 when the CPU 101 determines that the image data of all the pages are not stored.

When the processing proceeds to step S2019, the CPU 101 controls the printing unit 116 so that the printing starts from the final page. For example, if the image data of 30 pages is transmitted from the PC 501, the CPU 101 performs printing in the revere order from the image data of the 30th page after the image data of all 30 pages are stored in the HDD 104.

In step S2020, the CPU 101 determines whether one copy is printed. The processing returns to step S2019 and the printing continues when the CPU 101 determines that one copy is not printed, and proceeds to step S2021 when the CPU 101 determines that one copy is printed.

In step S2021, the CPU 101 staples the sheet bundle on which the images are printed and stacked on the bundle tray 60, and discharges the stapled sheets onto the discharge tray 22.

In step S2022, the CPU 101 determines whether the printing is completed. If the set number of printed copies is 1, the CPU 101 determines whether one copy is printed. When the set number of copies to be printed is more than one, the CPU 101 determines whether the set number of copies is printed. The processing is terminated if the CPU 101 determines that the printing is completed, and returns to step S2019 if the CPU 101 determines that the printing is not completed.

When the processing proceeds from step S2018 to step S2023, the CPU 101 checks the information on the number of sheets to be printed.

In step S2024, the CPU 101 determines whether the number of sheet to be printed exceeds the upper limit of the number of stapled sheets. The processing returns to S2017 if the CPU 101 determines that the number sheets to be printed does not exceed the upper limit of the number of stapled sheets, and the printing continues, and proceeds to step S2025 if the CPU 101 determines that the number of sheets to be printed exceeded the upper limit of the number of stapled sheets.

Figure 13C:
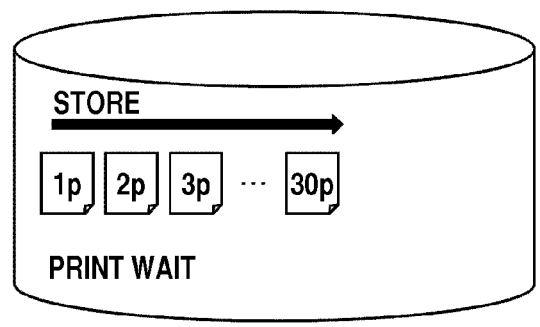
Figure 13D:
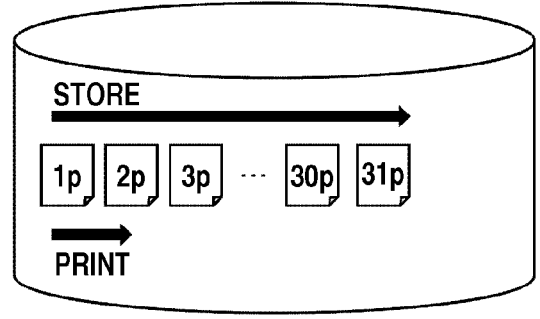

In step S2025, the CPU 101 controls the printing unit 116 so that the printing is performed from the top page. For example, if image data of 50 pages is transmitted from the PC 501, as illustrated in FIG. 13C, the CPU 101 starts printing the images after the image data of the 30th page is stored in the HDD 104. Then, as illustrated in FIG. 13D, when the image data of the 31st page is stored in the HDD 104, the CPU 101 determines that the number of printed sheets exceeded the upper limit of the number of stapled sheets, and starts printing from the first page.

In step S2026, the CPU 101 discharges the sheets on which the images are printed without stapling the sheets, and then the processing proceeds to step S2022.

In step S2022, the CPU 101 determines whether the printing is completed. If the number of printed copies is set to 1, the CPU 101 determines whether one copy is printed. The processing proceeds to step S2013 if the CPU 101 determines that one copy is printed, and proceeds to step S2015 if the CPU 101 determines that one copy is not printed. When the number of copies to be printed is set to more than one, the CPU 101 determines whether the set number of copies is printed. The processing is terminated if the CPU 101 determines that the printing is completed, and proceeds to step S2019 if the CPU 101 determines that the printing is not completed and the CPU 101 executes the printing of the next copy.

Next, the processing of storing image data in the HDD 104 is described with reference to FIG. 12. The processing corresponds to the processing in steps S2004, S2009, and S2017.

In step S2101, the CPU 201 stores the image data received from the PC 501 in the HDD 104.

In step S2102, the CPU 101 determines whether the image data of a single page is stored in the HDD 104. The processing proceeds to step S2103 if the CPU 101 determines that the data is stored, and returns to step S2101 and the storing of the image data continues.

In step S2103, the CPU 101 increments by 1 the page counter P prepared in step S2001, which represents the number of pages stored in the HDD 10.

In step S2104, the CPU 101 updates the number of sheets to be printed. If one-sided printing and 1 in 1 are set in the printer driver, the value of the page counter P represents the number of sheets to be printed. If the duplex printing and 1 in 1 are set, the number of sheets to be printed is P/2. Also if the one-sided printing and 2 in 1 are set, the number of sheets to be printed is P/2. If the duplex printing and 2 in 1 are set, the number of sheets to be printed is P/4. The number of sheets to be printed is P/N when N in 1 such as 4 in 1 or 8 in 1 as with 2 in 1 is, set for the one-sided printing. In the case of duplex printing, the number of sheets to be printed is (P/N)/2.

In step S2105, the CPU 101 determines whether image data of all the pages is stored. When the image data of all the pages is not stored, the processing returns to step S2101 and the storing of the image data continues. If the image data of all the pages are stored, the CPU 101 terminates the processing.

As described above, even if the reverse order printing is required to perform stapling at the position set by the user, the printing immediately starts from the top page when the number of sheets to be printed exceeds the upper limit of the number of stapled sheets. Thus, meaningless delay of the print start in an attempt to perform the reverse order printing in the case where the stapling is not performed can be prevented.

In the first exemplary embodiment, the print job is described in which the image data and the print settings are received from the PC 501 and the image is printed. However, an exemplary embodiment of the present invention is not limited to this, and may be applied to a copy job in which an image of an original document read by the reading unit 115 is printed in accordance with the print settings received through the operation unit 150. Here, the CPU 101 receives the print settings through the screens illustrated in FIGS. 9A to 9C.

The first exemplary embodiment is described with the stapling processing of binding the sheets by driving a staple into the sheets as an example. The exemplary embodiment is not limited to this, and can be applied to stapleless stapling by which the sheets are crimp bound. In this case, the number of sheets that can be bound at once is smaller than in the stapling processing where the sheets are bound with a staple. Thus, the operations in the flowchart in FIG. 11 is executed with the upper limit of the number of stapled sheets set to M when the stapling with a staple is instructed and set to N which is smaller than M when the stapleless stapling is instructed.

In the first exemplary embodiment, the CPU 101 of the printing apparatus 100 performs the control so that the stored pages are printed from the top page even before the image data of the final page is stored in the HDD 104 when the number of sheets to be printed exceeds the upper limit of the number of stapled sheets.

In a second exemplary embodiment, an example is described where, upon determining that the number of sheets to be printed exceeded the upper limit of the number of stapled sheets, the PC 501 causes the printing apparatus 100 to perform the normal order printing even if the reverse order printing is required to perform the stapling at the position set by the user.

The configuration of the PC 501 is as described with reference with FIG. 5 in the first exemplary embodiment, and thus will not be described in detail.

Figure 15:
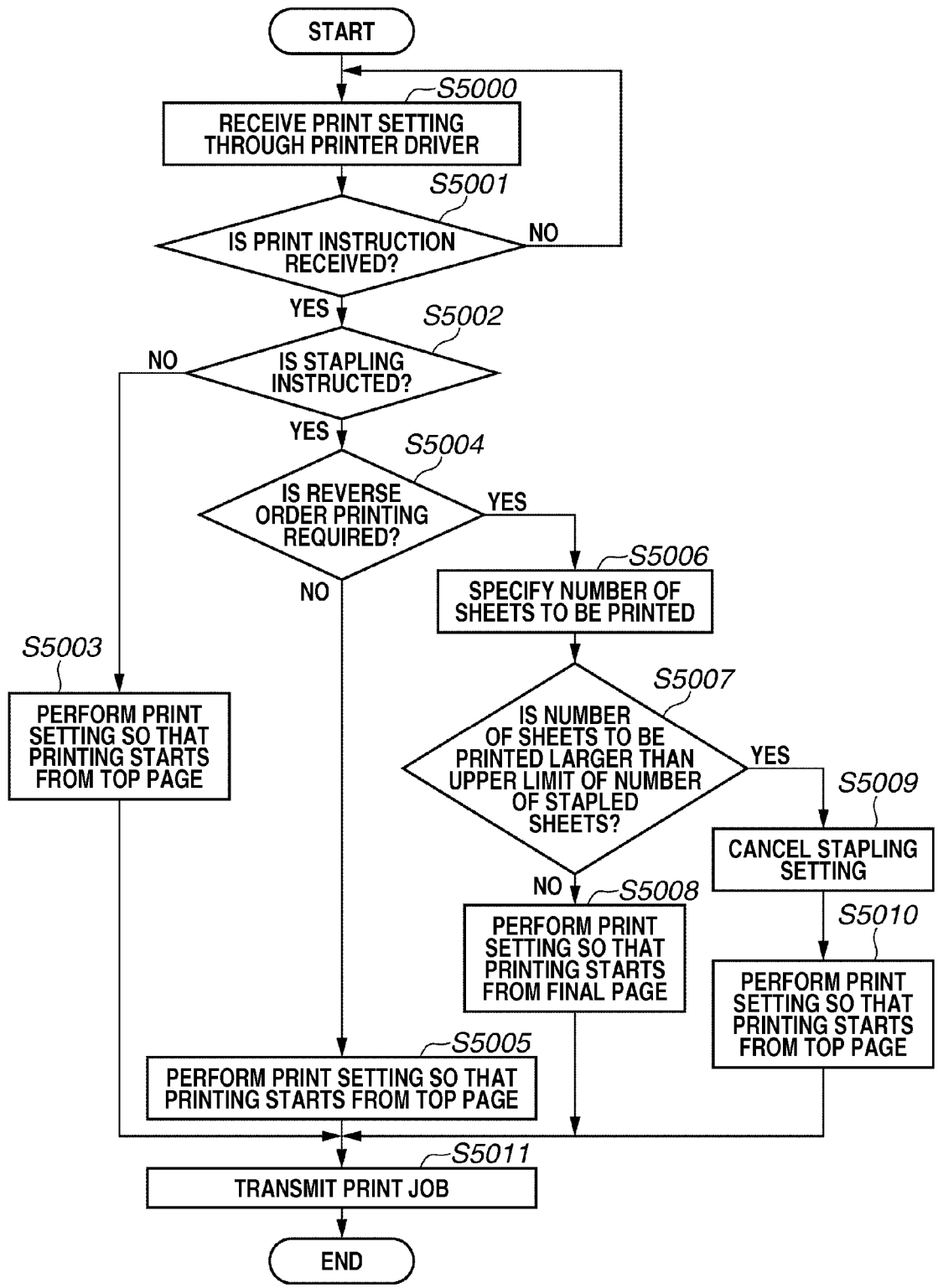
FIG. 15 is a flowchart illustrating processing according to a second exemplary embodiment.

The processing according to the second exemplary embodiment which is executed as the CPU 601 of the PC 501 reads out and executes a program stored in the ROM 603 is described with reference to the flowchart in FIG. 15. The processing in the flowchart starts when the user specifies the image to be printed on the PC 501 and activates the printer driver.

First, in step S5000, the CPU 601 receives the print settings through the printer driver illustrated in FIGS. 6 and 7.

In step S5001, the CPU 601 determines whether the print instruction is received. The user gives the print instruction by pressing the OK key in FIG. 6, for example. When the CPU 601 determines that the print instruction is not received, the processing returns to step S5000 and the CPU 601 continues receiving the print settings. When the CPU 601 determines that the print instruction is received, the processing proceeds to step S5002.

In step S5002, the CPU 601 determines whether the stapling is instructed through the printer driver. The processing proceeds to step S5003 when the CPU 601 determines that the printing is instructed, and proceeds to step S5003 when the CPU 601 determines that the printing is not instructed.

In step S5003, the CPU 601 performs a print setting so that the printing starts from the top page.

In step S5011, the CPU 601 transmits the print settings and the image data to the printing apparatus 100 to cause the printing apparatus 100 to start the printing of the image data from the top page.

When the processing proceeds from step S5002 to step S5004, the CPU 601 determines whether the reverse order printing (printing from the final page) is required. Specifically, the CPU 601 determines whether the reverse order printing is required based on the stapling position, the orientation, and the table in FIG. 10. In the second exemplary embodiment, the table illustrated in FIG. 10 is assumed to be stored in the HDD 604 of the PC 601. The processing proceeds to step S5005 when the CPU 601 determines that the reverse order printing is not required, and proceeds to step S5006 when the CPU 601 determines that the reverse order printing is required.

In step S5005 the CPU 601 performs the print setting so that the printing starts from the top page.

In step S5011, the CPU 601 transmits the print setting and the image data to the printing apparatus 100 and causes the printing apparatus 100 to perform the printing of the image data from the top page.

When the processing proceeds from step S5004 to step S5006, the CPU 601 specifies the number of sheets to be printed based on the number of pages of the image data to be printed and the print settings. For example, if one-sided printing and 1 in 1 are set in the printer driver, the number of pages to be printed is equal to the number of sheets to be printed. If the duplex printing and 1 in 1 are set, the number of sheets to be printed is (the number of pages to be printed)/2. Also if the one-sided printing and 2 in 1 are set, the number of sheets to be printed is (the number of pages to be printed)/2. If the duplex printing and 2 in 1 are set, the number of sheets to be printed is (the number of pages to be printed)/4.

In step S5007, the CPU 601 determines whether the number of sheets to be printed is larger than the upper limit of the number of stapled sheets. The processing proceeds to step S5008 when the CPU 601 determines that the number of sheets to be printed does not exceed the upper limit of the number of stapled sheets, and proceeds to step S5009 when the CPU 601 determines that the number of sheets to be printed exceeds the upper limit of the number of stapled sheets.

In step S5008, the CPU 601 performs the print setting so that the printing starts from the final page.

In step S5011, the CPU 601 transmits the print settings and the image data to the printing apparatus 100 and causes the printing apparatus 100 to perform the printing from the image data of the final page.

When the processing proceeds from step S5007 to step S5009, the CPU 601 cancels the stapling setting in the print settings. More specifically, the CPU 601 performs control so that the printing apparatus 100 does not perform the stapling.

In step S5010, the CPU 601 performs the print setting so that the printing starts from the top page.

In step S5011, the CPU 601 transmits the print settings and the image data to the printing apparatus 100 to cause the printing apparatus 100 to perform the printing of the image data from the top page.

Figure 16:
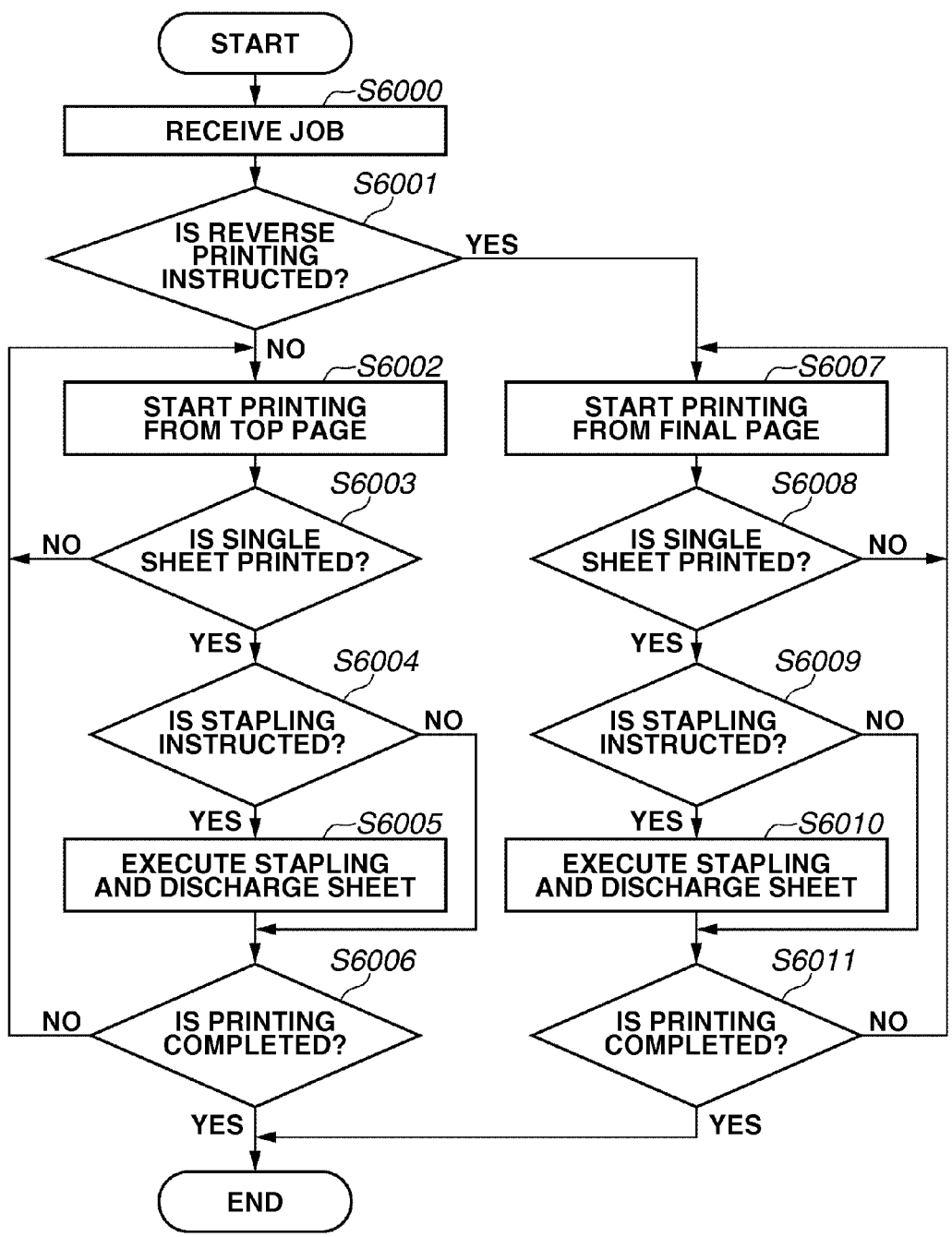
FIG. 16 is a flowchart illustrating processing according to the second exemplary embodiment.

Next, the control performed by the CPU 101 of the printing apparatus 100 in the second exemplary embodiment is described with reference to the flowchart in FIG. 16. The processing in the flowchart is executed as the CPU 101 reads out and executes the program stored in the ROM 103.

In step S6000, the CPU 101 receives a job from the PC 501 through the LAN 500.

In step S6001, the CPU 101 determines whether the reverse order printing is instructed in the print settings of the received job. The processing proceeds to steps S6002 when the CPU determines that the reverse order printing is not instructed in the print settings (printing from the top page is instructed), and proceeds to step S6007 if the CPU 101 determines that the reverse order printing is instructed in the print settings (printing from the final page is instructed).

In step S6002, the CPU 101 causes the printing unit 116 to start the printing from the top page.

In step S6003, the CPU 101 determines whether one copy is printed. The processing returns to step S6002 when the CPU 101 determines that one copy is not printed, and proceeds to step S6004 when the CPU 101 determines that one copy is printed.

In step S6004, the CPU 101 determines whether the stapling is instructed in the print settings of the job. The processing proceeds to step S6005 when the CPU 101 determines that the stapling is instructed, and proceeds to step S6006 with the processing in step S6005 not performed if the CPU 101 determines that the stapling is not instructed. In step S6005, the CPU 101 staples the sheet bundle stacked on the bundle tray 60, and discharges the stapled sheet bundle onto the discharge tray 22.

In step S6006 the CPU 101 determines whether the printing is completed. If the set number of copies to be printed is 1, the CPU 101 determines whether one copy is printed. If the set number of copies to be printed is more than 1, the CPU 101 determines whether the set number of copies is printed. The processing returns to step S6002 if the printing is not completed and is terminated if the printing is completed.

When the processing proceeds from step S6001 to step S6007, the CPU 101 causes the printing unit 116 to start the printing from the final page.

In step S6008, the CPU 101 determines whether one copy is printed. The processing returns to step S6007 when the CPU 101 determines that one copy is not printed, and proceeds to step S6009 when the CPU 101 determines that one copy is printed.

In step S6009, the CPU 101 determines whether the stapling is instructed in the print settings of the job. The processing proceeds to step S6010 when the CPU 101 determines that the stapling is instructed, and proceeds to step S6011 with the processing in step S6010 not performed if the CPU 101 determines that the stapling is not instructed.

In step S6010 the CPU 101 executes stapling on the sheet bundle on which the images are printed stacked on the bundle tray 60, and discharges the stapled sheet bundle onto the discharge tray 22.

In step S6011 the CPU 101 determines whether the printing is completed. If the set number of copies to be printed is 1, the CPU 101 determines whether one copy is printed. If the set number of copies to be printed is more than 1, the CPU 101 determines whether the set number of copies is printed. The processing returns to step S6007 if the printing is not completed, and is terminated if the printing is completed.

As described above, even if the reverse order printing is required for the stapling to be executed at the position set by the user, the PC 501 causes the printing apparatus 100 to start the printing from the top page upon determining that the number of sheets to be printed exceeded the upper limit of the number of stapled sheets. Thus, the meaningless delay of print start in an attempt to execute reverse order printing can be prevented in the case where the sheets to be output are not stapled.

Other Embodiments

The exemplary embodiments where the stapling is performed are described, but punching may be performed instead.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-255117 filed Nov. 21, 2012, which is hereby incorporated by reference herein in its entirety.

What is claimed is:

1. A printing control apparatus comprising:
an input unit configured to input image data pieces of a plurality of pages;
a storing unit configured to store the image data pieces input by the input unit;
a determining unit configured to determine whether post processing has been designated for a first position on a sheet or a second position on the sheet; and
a control unit configured to control a printing unit such that at least timing of start of printing and print order of the plurality of pages depend on whether a number of sheets to be used for printing exceeds a number of sheets on which the post processing is performable,
wherein, in a case where it is determined by the determining unit that post processing has been designated for the second position and, until storing of all of the image data pieces in the storing unit is completed, it is judged that a number of sheets to be used for printing does not exceed a number of sheets on which the post processing is performable, the control unit is configured to control the printing unit to start printing the plurality of pages from a last page among the plurality of pages after the storing of all of the image data pieces in the storing unit is completed, and
wherein, in a case where it is determined by the determining unit that post processing has been designated for the second position and, until storing of all of the image data pieces in the storing unit is completed, it is judged that a number of sheets to be used for printing exceeds a number of sheets on which the post processing is performable, the control unit is configured to control the printing unit to start printing the plurality of pages from a first page among the plurality of pages before the storing of all of the image data pieces in the storing unit is completed.

2. The printing control apparatus according to claim 1, wherein, in a case where it is determined by the determining unit that the post processing has been designated for the first position, the control unit is configured to control the printing unit to start printing the plurality of pages in the print order before the storing of all of the image data pieces in the storing unit is completed.

3. The printing control apparatus according to claim 1, wherein, in a case where the post processing is not designated, the control unit is configured to control the printing unit to start printing the plurality of pages in the print order before the storing of all of the image data pieces in the storing unit is completed.

4. The printing control apparatus according to claim 1, wherein the post processing is a stapling processing.

5. The printing control apparatus according to claim 1, wherein the post processing is a punching processing.

6. The printing control apparatus according to claim 1, wherein the control unit is configured to determine the number of sheets to be used for printing, based on a number of the plurality of pages corresponding to the image data pieces stored in the storing unit and a setting of duplex printing.

7. The printing control apparatus according to claim 1, wherein the control unit is configured to determine the number of sheets to be used for printing, based on a number of the plurality of pages corresponding to the image data pieces stored in the storing unit and a setting of N in 1 printing.

8. A method for controlling a printing control apparatus, the method comprising:
inputting image data pieces of a plurality of pages;
storing the input image data pieces;
determining whether post processing has been designated for a first position on a sheet or a second position on the sheet; and
controlling a printing unit such that at least timing of start of printing and print order of the plurality of pages depend on whether a number of sheets to be used for printing exceeds a number of sheets on which the post processing is performable,
wherein, in a case where it is determined that post processing has been designated for the second position and, until storing of all of the image data pieces is completed, it is judged that a number of sheets to be used for printing does not exceed a number of sheets on which the post processing is performable, controlling includes controlling the printing unit to start printing the plurality of pages from a last page among the plurality of pages after the storing of all of the image data pieces is completed, and
wherein, in a case where it is determined that post processing has been designated for the second position and, until storing of all of the image data pieces is completed, it is judged that a number of sheets to be used for printing exceeds a number of sheets on which the post processing is performable, controlling includes controlling the printing unit to start printing the plurality of pages from a first page among the plurality of pages before the storing of all of the image data pieces is completed.

9. A non-transitory computer-readable storage medium storing a program to cause a computer to perform a method for controlling a printing control apparatus, the method comprising:
inputting image data pieces of a plurality of pages;
storing the input image data pieces;
determining whether post processing has been designated for a first position on a sheet or a second position on the sheet; and
controlling a printing unit such that at least timing of start of printing and print order of the plurality of pages depend on whether a number of sheets to be used for printing exceeds a number of sheets on which the post processing is performable,
wherein, in a case where it is determined that post processing has been designated for the second position and, until storing of all of the image data pieces is completed, it is judged that a number of sheets to be used for printing does not exceed a number of sheets on which the post processing is performable, controlling includes controlling the printing unit to start printing the plurality of pages from a last page among the plurality of pages after the storing of all of the image data pieces is completed, and
wherein, in a case where it is determined that post processing has been designated for the second position and, until storing of all of the image data pieces is completed, it is judged that a number of sheets to be used for printing exceeds a number of sheets on which the post processing is performable, controlling includes controlling the printing unit to start printing the plurality of pages from a first page among the plurality of pages before the storing of all of the image data pieces is completed.

10. The printing control apparatus according to claim 1, wherein the control unit further is configured to control a post processing unit,
wherein, in a case where it is determined by the determining unit that post processing has been designated for the second position and, until storing of all of the image data pieces in the storing unit is completed, it is judged that a number of sheets to be used for printing does not exceed a number of sheets on which the post processing is performable, the control unit is configured to control the post processing unit to discharge printed sheets after performing the post processing on the second position, and
wherein, in a case where it is determined by the determining unit that post processing has been designated for the second position and, until storing of all of the image data pieces in the storing unit is completed, it is judged that a number of sheets to be used for printing exceeds a number of sheets on which the post processing is performable, the control unit is configured to control the post processing unit to discharge printed sheets without performing the post processing.

11. The printing control apparatus according to claim 1, wherein the post processing is a binding process for binding sheets without using a stapler.

12. The method according to claim 8, wherein, in a case where it is determined that the post processing has been designated for the first position, controlling includes controlling the printing unit to start printing the plurality of pages in the print order before the storing of all of the image data pieces is completed.

13. The method according to claim 8, wherein, in a case where the post processing is not designated, controlling includes controlling the printing unit to start printing the plurality of pages in the print order before the storing of all of the image data pieces is completed.

14. The method according to claim 8, wherein the post processing is at least one of a stapling processing, a punching processing, and a binding process for binding sheets without using a stapler.

15. The non-transitory computer-readable storage medium according to claim 9, wherein controlling includes determining the number of sheets to be used for printing, based on a number of the plurality of pages corresponding to the image data pieces stored and a setting of duplex printing.

16. The method according to claim 8, wherein controlling includes determining the number of sheets to be used for printing, based on a number of the plurality of pages corresponding to the image data pieces stored and a setting of N in 1 printing.

17. The method according to claim 8, wherein controlling further includes controlling a post processing unit,
wherein, in a case where it is determined that post processing has been designated for the second position and, until storing of all of the image data pieces is completed, it is judged that a number of sheets to be used for printing does not exceed a number of sheets on which the post processing is performable, controlling includes controlling the post processing unit to discharge printed sheets after performing the post processing on the second position, and
wherein, in a case where it is determined that post processing has been designated for the second position and, until storing of all of the image data pieces is completed, it is judged that a number of sheets to be used for printing exceeds a number of sheets on which the post processing is performable, controlling includes controlling the post processing unit to discharge printed sheets without performing the post processing.

18. The non-transitory computer-readable storage medium according to claim 9, wherein, in a case where it is determined that the post processing has been designated for the first position, controlling includes controlling the printing unit to start printing the plurality of pages in the print order before the storing of all of the image data pieces is completed.

19. The non-transitory computer-readable storage medium according to claim 9, wherein, in a case where the post processing is not designated, controlling includes controlling the printing unit to start printing the plurality of pages in the print order before the storing of all of the image data pieces is completed.

20. The non-transitory computer-readable storage medium according to claim 9, wherein controlling further includes controlling a post processing unit,
wherein, in a case where it is determined that post processing has been designated for the second position and, until storing of all of the image data pieces is completed, it is judged that a number of sheets to be used for printing does not exceed a number of sheets on which the post processing is performable, controlling includes controlling the post processing unit to discharge printed sheets after performing the post processing on the second position, and
wherein, in a case where it is determined that post processing has been designated for the second position and, until storing of all of the image data pieces is completed, it is judged that a number of sheets to be used for printing exceeds a number of sheets on which the post processing is performable, controlling includes controlling the post processing unit to discharge printed sheets without performing the post processing.

* * * * *